US007155516B2

United States Patent
Musoll et al.

(10) Patent No.: US 7,155,516 B2
(45) Date of Patent: Dec. 26, 2006

(54) METHOD AND APPARATUS FOR OVERFLOWING DATA PACKETS TO A SOFTWARE-CONTROLLED MEMORY WHEN THEY DO NOT FIT INTO A HARDWARE-CONTROLLED MEMORY

(75) Inventors: Enrique Musoll, San Jose, CA (US); Stephen Melvin, San Francisco, CA (US); Mario Nemirovsky, Saratoga, CA (US)

(73) Assignee: MIPS Technologies, Inc., Mountain View, CA (US)

( * ) Notice: Subject to any disclaimer, the term of this patent is extended or adjusted under 35 U.S.C. 154(b) by 506 days.

(21) Appl. No.: 09/964,827

(22) Filed: Sep. 25, 2001

(65) Prior Publication Data

US 2006/0036705 A1    Feb. 16, 2006

Related U.S. Application Data

(63) Continuation-in-part of application No. 09/881,934, filed on Jun. 14, 2001, which is a continuation-in-part of application No. 09/602,279, filed on Jun. 23, 2000, application No. 09/964,827, which is a continuation-in-part of application No. 09/737,375, filed on Dec. 14, 2000.

(60) Provisional application No. 60/181,364, filed on Feb. 8, 2000.

(51) Int. Cl.
*G06F 15/173* (2006.01)

(52) U.S. Cl. ............... 709/226; 370/392; 707/205; 709/210

(58) Field of Classification Search ............... 709/226, 709/210; 370/392; 707/205
See application file for complete search history.

(56) References Cited

U.S. PATENT DOCUMENTS

| 4,200,927 A | 4/1980 | Huges et al. |
| 4,707,784 A | 11/1987 | Ryan et al. |
| 4,942,518 A | 7/1990 | Weatherford et al. |
| 5,023,776 A | 6/1991 | Gregor |
| 5,121,383 A | 6/1992 | Golestani |
| 5,291,481 A | 3/1994 | Doshi et al. |
| 5,408,464 A | 4/1995 | Jurkevich |

(Continued)

FOREIGN PATENT DOCUMENTS

WO    WO 03/005645 A2    1/2003

OTHER PUBLICATIONS

* Knuth, Donald E., "The Art of Computer Programming, Third Edition, vol. 1, Fundamental Algorithms", "Sec. 2.5 Dynamic Storage Allocation", 1997, pp. 435-456, Addison-Wesley, US.

(Continued)

*Primary Examiner*—David Wiley
*Assistant Examiner*—Kyung Hye Shin
(74) *Attorney, Agent, or Firm*—Donald R. Boys; James W. Huffman

(57) ABSTRACT

A system for managing packets incoming to a data router has a local packet memory (LPM) mapped into pre-configured memory units, to store packets for processing, an external packet memory (EPM), a first storage system to store packets in the LPM, and a second storage system to store packets in the EPM. The system is characterized in that the first storage system attempts to store all incoming packets in the LPM, and for those packets that are not compatible with the LPM, relinquishes control to the second system, which stores the LPM-incompatible packets in the EPM.

21 Claims, 15 Drawing Sheets

Allocation algorithm implementation

U.S. PATENT DOCUMENTS

| | | | |
|---|---|---|---|
| 5,465,331 A | 11/1995 | Yang et al. | |
| 5,471,598 A | 11/1995 | Quattromani et al. | |
| 5,521,916 A | 5/1996 | Choudhury et al. | |
| 5,559,970 A | 9/1996 | Sharma | |
| 5,619,497 A | 4/1997 | Gallagher et al. | |
| 5,634,015 A | 5/1997 | Chang et al. | |
| 5,659,797 A | 8/1997 | Zandveld et al. | |
| 5,675,790 A * | 10/1997 | Walls | 707/205 |
| 5,708,814 A | 1/1998 | Short et al. | |
| 5,724,565 A | 3/1998 | Dubey et al. | |
| 5,737,525 A | 4/1998 | Picazo et al. | |
| 5,784,649 A * | 7/1998 | Begur et al. | 710/52 |
| 5,784,699 A | 7/1998 | McMahon et al. | |
| 5,796,966 A | 8/1998 | Simcoe et al. | |
| 5,809,321 A | 9/1998 | Hansen et al. | |
| 5,812,810 A | 9/1998 | Sager | |
| 5,892,966 A | 4/1999 | Petrick et al. | |
| 5,918,050 A | 6/1999 | Rosenthal et al. | |
| 5,951,679 A | 9/1999 | Anderson et al. | |
| 5,978,570 A | 11/1999 | Hillis | |
| 5,978,893 A | 11/1999 | Bakshi et al. | |
| 5,987,578 A | 11/1999 | Butcher | |
| 6,009,516 A | 12/1999 | Steiss et al. | |
| 6,016,308 A | 1/2000 | Crayford et al. | |
| 6,023,738 A | 2/2000 | Priem et al. | |
| 6,047,122 A | 4/2000 | Spiller | |
| 6,070,202 A | 5/2000 | Minkoff et al. | |
| 6,073,251 A | 6/2000 | Jewett et al. | |
| 6,088,745 A | 7/2000 | Bertagna et al. | |
| 6,131,163 A | 10/2000 | Wiegel | |
| 6,151,644 A | 11/2000 | Wu | |
| 6,157,955 A | 12/2000 | Narad et al. | |
| 6,169,745 B1 | 1/2001 | Liu et al. | |
| 6,219,339 B1 | 4/2001 | Doshi et al. | |
| 6,219,783 B1 | 4/2001 | Zahir et al. | |
| 6,223,274 B1 | 4/2001 | Catthoor et al. | |
| 6,226,680 B1 | 5/2001 | Boucher et al. | |
| 6,247,105 B1 | 6/2001 | Goldstein et al. | |
| 6,249,801 B1 | 6/2001 | Zisapel et al. | |
| 6,253,313 B1 | 6/2001 | Morrison et al. | |
| 6,263,452 B1 | 7/2001 | Jewett et al. | |
| 6,381,242 B1 | 4/2002 | Maher, III et al. | |
| 6,389,468 B1 | 5/2002 | Muller et al. | |
| 6,438,135 B1 | 8/2002 | Tzeng | |
| 6,453,360 B1 | 9/2002 | Muller et al. | |
| 6,460,105 B1 | 10/2002 | Jones et al. | |
| 6,483,804 B1 | 11/2002 | Muller et al. | |
| 6,502,213 B1 | 12/2002 | Bowman-Amuah | |
| 6,523,109 B1 | 2/2003 | Meier | |
| 6,529,515 B1 * | 3/2003 | Raz et al. | 370/401 |
| 6,535,905 B1 | 3/2003 | Kalafatis et al. | |
| 6,614,796 B1 | 9/2003 | Black et al. | |
| 6,625,808 B1 * | 9/2003 | Tarditi | 717/154 |
| 6,640,248 B1 * | 10/2003 | Jorgensen | 709/226 |
| 6,650,640 B1 | 11/2003 | Muller et al. | |
| 6,738,371 B1 * | 5/2004 | Ayres | 370/352 |
| 6,738,378 B1 * | 5/2004 | Tuck et al. | 370/392 |
| 6,813,268 B1 * | 11/2004 | Kalkunte et al. | 370/392 |
| 6,820,087 B1 | 11/2004 | Langendorf et al. | |
| 2001/0004755 A1 | 6/2001 | Levy et al. | |
| 2001/0005253 A1 | 6/2001 | Komatsu | |
| 2001/0024456 A1 | 9/2001 | Zaun et al. | |
| 2001/0043610 A1 | 11/2001 | Nemirovsky et al. | |
| 2001/0052053 A1 | 12/2001 | Nemirovsky et al. | |
| 2002/0016883 A1 | 2/2002 | Musoll et al. | |
| 2002/0049964 A1 | 4/2002 | Takayama et al. | |
| 2002/0054603 A1 | 5/2002 | Musoll et al. | |
| 2002/0071393 A1 | 6/2002 | Musoll | |
| 2002/0083173 A1 | 6/2002 | Musoll et al. | |
| 2002/0124262 A1 | 9/2002 | Basso et al. | |
| 2004/0015598 A1 | 1/2004 | Lin | |
| 2004/0148382 A1 | 7/2004 | Narad et al. | |
| 2004/0172471 A1 | 9/2004 | Porter | |
| 2004/0172504 A1 | 9/2004 | Balazich et al. | |
| 2004/0213251 A1 | 10/2004 | Tran et al. | |
| 2005/0061401 A1 | 3/2005 | Tokoro et al. | |

OTHER PUBLICATIONS

* Diefendorff, Keith, K7 Challenges Intel, Microprocessor Report, Oct. 26, 1998, vol. 12, No. 14, US.

U.S. Appl. No. 09/608,750, Nemirovsky et al.

Melvin et al., Extended Instruction Set for a Packet Processing Applications:, Jul. 5, 2001, Disclosure Document #496559, USPTO.

Musoll et al, "Mechanism for Allowing a Limited Packet Head and/or Tail Growth Without Moving the Packet to a Different Memory Location," Apr. 16, 2001, Disclosure Document #492429, USPTO.

Musoll et al, "Mechanism to Activate a Context When No Stream is Running in a Multi-Streaming Processing Core", Apr. 16, 2001, Disclosure Document #492431, USPTO.

Musoll, Enrique, Functional Validation of a Packet Management Unit:, May 18, 2001, Disclosure Document #494011, USPTO.

Sampath et al, Mechanism To Un-Speculatively Pre-Fetch Instructions From the Thread Associated to a Packet:, Jul. 5, 2001, Disclosure Document #491527, USPTO.

Yamamoto, Wayne. *An Analysis of Multistreamed, Superscalar Processor Architectures*. University of California Santa Barbara Dissertation. Dec. 1995. Santa Barbara, US.

Yamamoto et al. "Increasing Superscalar Performance Through Multistreaming." *Parallel Architectures and Compilation Techniques (PACT '95)*. 1995.

The PowerPC Architecture: A Specification for a New Family of RISC Processors. 2nd Ed. May 1994. pp. 70-72. Morgan Kaufmann. San Francisco, US.

MC68020 32-Bit Microprocessor User's Manual. 3rd Ed., 1989. pp. 3-125, 3-126, and 3-127. Prentice Hall, NJ, US.

Musoll et al, Mechanism to Overflow Packets to a Software Controlled Memory When They Do Not Fit intoa Hardware Controlled Memory, Jul. 3, 2001, Disclosure Document #496391, USPTO.

Pai, Vijay et al. "An Evaluation of Memory Consistency Models for Shared-Memory Systems with ILP Processors." *Proceedings of ASPLOS-VII*, Oct. 1996: pp. 12-23, ACM, Inc.

Potel, M. J. "Real-Time Playback in Animation Systems," *Proceedings of the 4th Annual Conference on Computer Graphics and Interactive Techniques*. 1977. pp. 72-77, San Jose, CA, US.

ARM Architecture Reference Manual. 1996. pp. 3-41, 3-42, 3-43, 3-67, and 3-68. Prentice Hall, NJ, US.

ESA/390 Principles of Operation. IBM Online Publications Center Reference No. SA22-7201-08. Table of Contents and paras. 7.5.31 and 7.5.70. IBM Corporation. Boulder, CO, US.

MC88110 Second Generation RISC Microprocessor User's Manual. 1991. pp. 10-66, 10-67, and 10-71. Motorola, Inc.

Diefendorff, Keith et al. "Organization of the Motorola 88110 Superscalar RISC Microprocessor." *IEEE Journal of Microelectronics*, Apr. 1992. pp. 40-63. vol. 12, No. 2, IEEE. New York, NY, US.

Kane, Gerry. *PA-RISC 2.0 Architecture*. 1996, pp. 7-106 and 7-107. Prentice Hall, NJ, US.

Diefendorff, Keith et al. "AltiVec Extension to PowerPC Accelerates Media Processing." *IEEE Journal of Microelectronics*. vol. 20, No. 2 (2000): pp. 85-95.

Grunewald, Winfried et al. "Towards Extremely Fast Context Switching in a Block Multithreaded Processor." *Proceedings of EUROMICRO 22*, 1996. pp. 592-599.

Bradford, Jeffrey et al. "Efficient Synchronization for Multithreaded Processors." *Workshop on Multithreaded Execution, Architecture, and Compilation*. Jan.-Feb. 1998. pp. 1-4.

Yoaz et al. "Speculation Techniques for Improving Load Related Instruction Scheduling." 1999. pp. 42-53, IEEE.

Kessler, R. E. "The Alpha 21264 Microprocessor: Out-of-Order Execution at 600 MHz." Aug. 1998.

Donaldson et al. "DISC: Dynamic Instruction Stream Computer, An Evaluation of Performance." 26th *Hawaii Conference on Systems Sciences*. vol. 1. 1993. pp. 448-456.

Musoll et al, "Hardware Algorithm for Allocating and De-Allocating Consecutive Blocks of Memory," Apr. 3, 2001, Disclosure Document #491557, USPTO.

Nemirovsky et al., "DISC: Dynamic Instruction Stream Computer." ACM. 1991. pp. 163-171.

U.S. Appl. No. 09/602,279, Nemirovsky et al.

Musoll et al. Mechanism to Prevent the Download of a Packet with Pending Writes Affecting Its Data. Apr. 11, 2001, Disclosure Document #492430, USTPO.

Ungerer et al. A Survey of Processors with Explicit Multithreading. ACM Computing Surveys, vol. 35, No. 1, Mar. 2003. pp. 29-63.

U.S. Appl. No. 09/591,510, filed Jun. 12, 2000, Gelinas et al.

U.S. Appl. No. 09/881,934, Enrique Musoll et al.

U.S. Appl. No. 09/602,279, Mario Nemirovsky et al.

U.S. Appl. No. 09/737,375, Mario Nemirovsky et al.

U.S. Appl. No. 60/181,364, Mario Nemirovsky et al.

Enrique Musoll et al. Mechanism to Overflow Packets to a Software Controlled Memory When They Do Not Fit into a Hardware Controlled Memory, Jul. 3, 2001, Disclosure Document #496391, USPTO.

Enrique Musoll et al. Hardware Algorithm for Allocating and De-allocating Consecutive Blocks of Memory Apr. 3, 2001, Disclosure Document #491557, USPTO.

\* cited by examiner

METHOD AND APPARATUS FOR OVERFLOWING DATA PACKETS TO A SOFTWARE-CONTROLLED MEMORY WHEN THEY DO NOT FIT INTO A HARDWARE-CONTROLLED MEMORY

CROSS-REFERENCE TO RELATED DOCUMENTS

The present invention is a continuation in part (CIP) to a U.S. patent application Ser. No. 09/881,934 entitled "Method and Apparatus for Allocating and De-allocating Consecutive Blocks of Memory in Background Memory Management" filed on Jun. 14, 2001, the conception of which was documented in Disclosure Document No. 491,557, entitled "Hardware Algorithm for Allocating and De-allocating Consecutive Blocks of Memory", filed on Apr. 3, 2001. Ser. No. 09/881,934 is a CIP to a U.S. patent application Ser. No. 09/602,279 entitled "Methods and Apparatus for Background Memory Management" filed on Jun. 23, 2000. The present invention is also a CIP to a U.S. patent application Ser. No. 09/737,375 entitled "Queuing System for Processors in Packet Routing Operations" and filed on Dec. 14, 2000, the latter claiming priority to a provisional patent application Ser. No. 60/181,364 filed on Feb. 8, 2000. The referenced applications and documents are incorporated herein by reference.

FIELD OF THE INVENTION

The present invention is in the field of digital processing and pertains to apparatus and methods for processing packets in routers for packet networks, and more particularly to methods for treating data packets in routing operations using different types of processors and multi processor systems, especially in dynamic multi-streaming processors.

BACKGROUND OF THE INVENTION

Microprocessors, as is well-known in the art, are integrated circuit (IC) devices that are enabled to execute code sequences which may be generalized as software. In the execution most microprocessors are capable of both logic and arithmetic operations, and typically modern microprocessors have on-chip resources (functional units) for such processing.

Microprocessors in their execution of software strings typically operate on data that is stored in memory. This data needs to be brought into the memory before the processing is done, and sometimes needs to be sent out to a device that needs it after its processing.

There are in the state-of-the-art two well-known mechanisms to bring data into the memory and send it out to a device when necessary. One mechanism is loading and storing the data through a sequence of Input/Output (I/O) instructions. The other is through a direct-memory access device (DMA).

In the case of a sequence of I/O instructions, the processor spends significant resources in explicitly moving data in and out of the memory. In the case of a DMA system, the processor programs an external hardware circuitry to perform the data transferring. The DMA circuitry performs all of the required memory accesses to perform the data transfer to and from the memory, and sends an acknowledgement to the processor when the transfer is completed.

In both cases of memory management in the art the processor has to explicitly perform the management of the memory, that is, to decide whether the desired data structure fits into the available memory space or does not, and where in the memory to store the data. To make such decisions the processor needs to keep track of the regions of memory wherein useful data is stored, and regions that are free (available for data storage). Once that data is processed, and sent out to another device or location, the region of memory formerly associated with the data is free to be used again by new data to be brought into memory. If a data structure fits into the available memory, the processor needs to decide where the data structure will be stored. Also, depending on the requirements of the processing, the data structure can be stored either consecutively, in which case the data structure must occupy one of the empty regions of memory; or non-consecutively, wherein the data structure may be partitioned into pieces, and the pieces are then stored into two or more empty regions of memory.

An advantage of consecutively storing a data structure into memory is that the accessing of this data becomes easier, since only a pointer to the beginning of the data is needed to access all the data.

When data is not consecutively stored into the memory, access to the data becomes more difficult because the processor needs to determine the explicit locations of the specific bytes it needs. This can be done either in software (i.e. the processor will spend its resources to do this task) or in hardware (using a special circuitry). A drawback of consecutively storing the data into memory is that memory fragmentation occurs. Memory fragmentation happens when the available chunks of memory are smaller than the data structure that needs to be stored, but the addition of the space of the available chunks is larger than the space needed by the data structure. Thus, even though enough space exists in the memory to store the data structure, it cannot be consecutively stored.

In the provisional patent application listed as one of the references in the Cross-Reference to Related Documents above, there are descriptions and drawings for a preferred architecture for a dynamic multi-streaming processor (DMS) for, among other tasks, packet processing. One of the functional areas in that architecture is a queue and related methods and circuitry, comprising a queuing system. The dynamic queuing system and its related components are described in priority patent application Ser. No. 09/737,375. In priority application Ser. No. 09/737,375, a novel packet management unit (PMU) is described that offloads a processing core (termed a streaming processor unit, or SPU) from having to upload packets into or download packets from memory, as well as relieving the unit of some other functions such as memory allocation. This is accomplished by providing a local packet memory (LPM) that is hardware-controlled, wherein data packets that fit therein are uploaded and downloaded by a hardware mechanism.

A background memory manager (BMM) for managing a memory in a data processing system is known to the inventor. The memory manager has circuitry for transferring data to and from an outside device and to and from a memory, a memory state map associated with the memory, and a communication link to a processor. The BMM manages the memory, determining if each data structure fits into the memory, deciding exactly where to place the data structure in memory, performing all data transfers between the outside device and the memory, maintaining the memory state map according to memory transactions made, and informing the processor of new data and its location. In preferred embodiments the BMM, in the process of storing data structures into the memory provides an identifier for each structure to the processor. The system is particularly applicable to Internet packet processing in packet routers.

Because software-managed memory is costly in terms of developing instructions to figure out which portions of memory within a memory block are free and which are available, a hardware mechanism such as the one described with reference to Ser. No. 09/602,279 enables more efficiency and therefore, cost savings. However, in order to optimize the function of such a hardware controller, a process must be provided to enable integrated and optimum function between hardware control and software control of memory. One of the preferred areas of use for such innovation is in the area of packet processing in data routing over networks.

A system described with reference to Ser. No. 09/881,934 is known to the inventor for allocating storage space for incoming data packets into a memory (LPM) of a packet processor. The system is implemented in hardware and has a number of capabilities for pre-configuring a LPM with atomic and virtual memory blocks or pages, which are allocated for packet storage.

One of the components of the system described above ascertains packet size of incoming data packets and determines whether or not they fit into LPM. This is accomplished by checking allocation state for virtual pages of a smallest size that is equal to or larger than the packet size, checking the allocation state for next larger virtual page, and so on, until an available (not used or allocated) virtual page is found of a size that accommodates the next data packet.

In this process, software is notified of the packet's presence and is provided the correct information for "core processing" of packet information. In some cases, however, data packets may arrive at a DMS processor of a size that do not fit in LPM under configured restrictions, and must therefore either be dropped, delayed until LPM space is available, or uploaded into some other memory. Causing a data packet to wait until LPM has a storage block of a size to store the data packet is not a desirable option because of priority concerns in that higher priority packets may be held up behind a packet waiting for LPM storage. Dropping data packets that do not fit is an option, but not the most desirable option, as many dropped packets could result in a negative effect on particular packet flow.

What is clearly needed is an efficient method of diverting or overflowing data packets that do not fit into LPM into a software-controlled memory. Such a method would enable efficient processing while minimizing problems in packet management and accounting.

SUMMARY OF THE INVENTION

In a preferred embodiment of the invention a system for managing packets incoming to a data router is provided, comprising a local packet memory (LPM) mapped into pre-configured memory units, to store packets for processing, an external packet memory (EPM), a first storage system to store packets in the LPM, and a second storage system to store packets in the EPM. The system is characterized in that the first storage system attempts to store all incoming packets in the LPM, and for those packets that are not compatible with the LPM, relinquishes control to the second system, which stores the LPM-incompatible packets in the EPM.

In one embodiment the storage system is hardware-controlled and the second storage system is software-controlled. Further, in some embodiments the pre-configured memory units comprise memory blocks of pre-programmed size available for consecutive packet storage within the memory. In some embodiments the data router is connected to and operates on the Internet network, and in others may be connected to and operates on a corporate wide-area-network (WAN).

In a preferred embodiment the first storage system is implemented as an integrated circuit (IC) or IC chip set. Also in some embodiments the first storage system provides a memory address to the second storage system in the event of upload of a packet into the second memory.

In another aspect of the invention a data packet router is provided, comprising external ports to receive and send data packets from and to neighboring connected routers, and a system for managing packets incoming to a data router, the system having a local packet memory (LPM) mapped into pre-configured memory units, to store packets for processing, an external packet memory (EPM), a first storage system to store packets in the LPM; and a second storage system to store packets in the EPM. The first storage system attempts to store all incoming packets in the LPM, and for those packets that are not compatible with the LPM, relinquishes control to the second system, which stores the LPM-incompatible packets in the EPM.

In a preferred embodiment the first storage system is hardware-controlled and the second storage system is software-controlled. In some embodiments the pre-configured memory units comprise memory blocks of pre-programmed size available for consecutive packet storage within the LPM.

In some embodiments the data router is connected to and operates on the Internet network. In others it operates on a corporate wide-area-network.

In yet another aspect of the invention a method for managing packets incoming to a data router is provided, comprising the steps of (a) attempting to store all incoming packets, by a first storage system, into a local packet memory (LPM) that is mapped into pre-configured memory units; (b) relinquishing packets incompatible with the LPM to a second storage system; and (c) storing the LPM-incompatible packets in an external packet memory by a second storage system. 14. The method of claim 13 wherein the data router is connected to and operates on the Internet network.

In some embodiments of the method the first storage system is hardware-controlled and the second storage system is software controlled. In other embodiments the data router is connected to and operates on a corporate wide-area-network (WAN). Also, in preferred embodiments, in step (a), the pre-configured memory units comprise memory blocks of pre-programmed size available for consecutive packet storage within the memory. The first and second storage systems may be implemented as an integrated circuit (IC) or IC chip set. Further, in some embodiments the second storage system is software-controlled.

In yet another embodiment of the invention a method for retrieving a data packet stored in an external packet memory (EPM) in a data router is provided, comprising the steps of (a) receiving a notification that packet processing is complete for a particular packet; (b) determining that the particular packet does not reside in a first memory; (c) requesting software to download the packet from the external packet memory, the download to begin at a pre-specified memory address provided with the request; (d) downloading the data packet from the overflow memory via software; and (e) performing routine packet accounting via hardware after the download is complete.

In some embodiments the data router is connected to and operates on the Internet network, and in some other embodiments is connected to and operates on the Internet network, and in others is connected to and operates on a corporate wide-area-network (WAN).

In some embodiments storage of packets in the EPM is enabled by a user-controlled mechanism, and if not enabled, packets found to be not compatible with the LPM are simply dropped. Also in some embodiments, if a first packet is dropped, a lock is asserted to prevent any other packet being dropped until the system has finished all processing associated with the first packet dropped. In some cases there is a mechanism for determining packet source, wherein lock is asserted only for packets having the same source as a packet dropped. Further, the mechanism for asserting a lock may involve a lock bit managed by software.

In some cases lock bits are provided for each packet source, enabling lock to be device-dependent, while in others the lock bits are bits of a common configuration register.

In embodiments of the invention taught in enabling detail below, for the first time a system is provided for packet handling in processing, that can manage most packets with hardware alone into and out of a local memory, especially configured for the process, and, in the event of a packet not compatible, that packet may be diverted to an external memory, managed by software.

BRIEF DESCRIPTION OF THE DRAWING FIGURES

DESCRIPTION OF THE PREFERRED EMBODIMENTS

Figure 1:
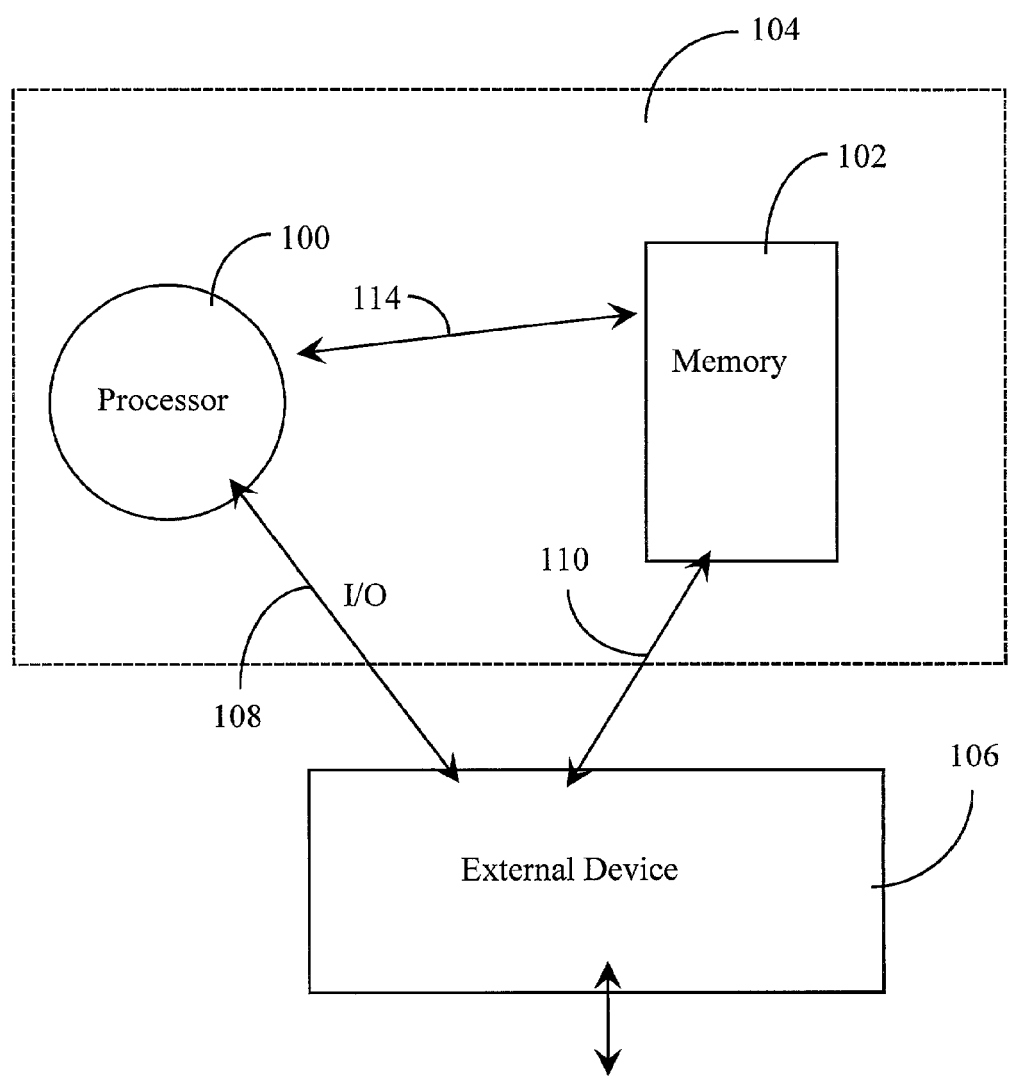
FIG. 1 is a simplified diagram of memory management by direct I/O processing in the prior art.

FIG. 1 is a simplified diagram of memory management in a system 104 comprising a processor 100 and a memory 102 in communication with a device 106. In this example it is necessary to bring data from device 106 into memory 102 for processing, and sometimes to transmit processed data from memory 102 to device 106, if necessary. Management in this prior art example is by processor 100, which sends I/O commands to and receives responses and/or interrupts from device 106 via path 108 to manage movement of data between device 106 and memory 102 by path 110. The processor has to determine whether a data structure can fit into available space in memory, and has to decide where in the memory to store incoming data structures. Processor 100 has to fully map and track memory blocks into and out of memory 102, and retrieves data for processing and stores results, when necessary, back to memory 102 via path 114. This memory management by I/O commands is very slow and cumbersome and uses processor resources quite liberally.

Figure 2:
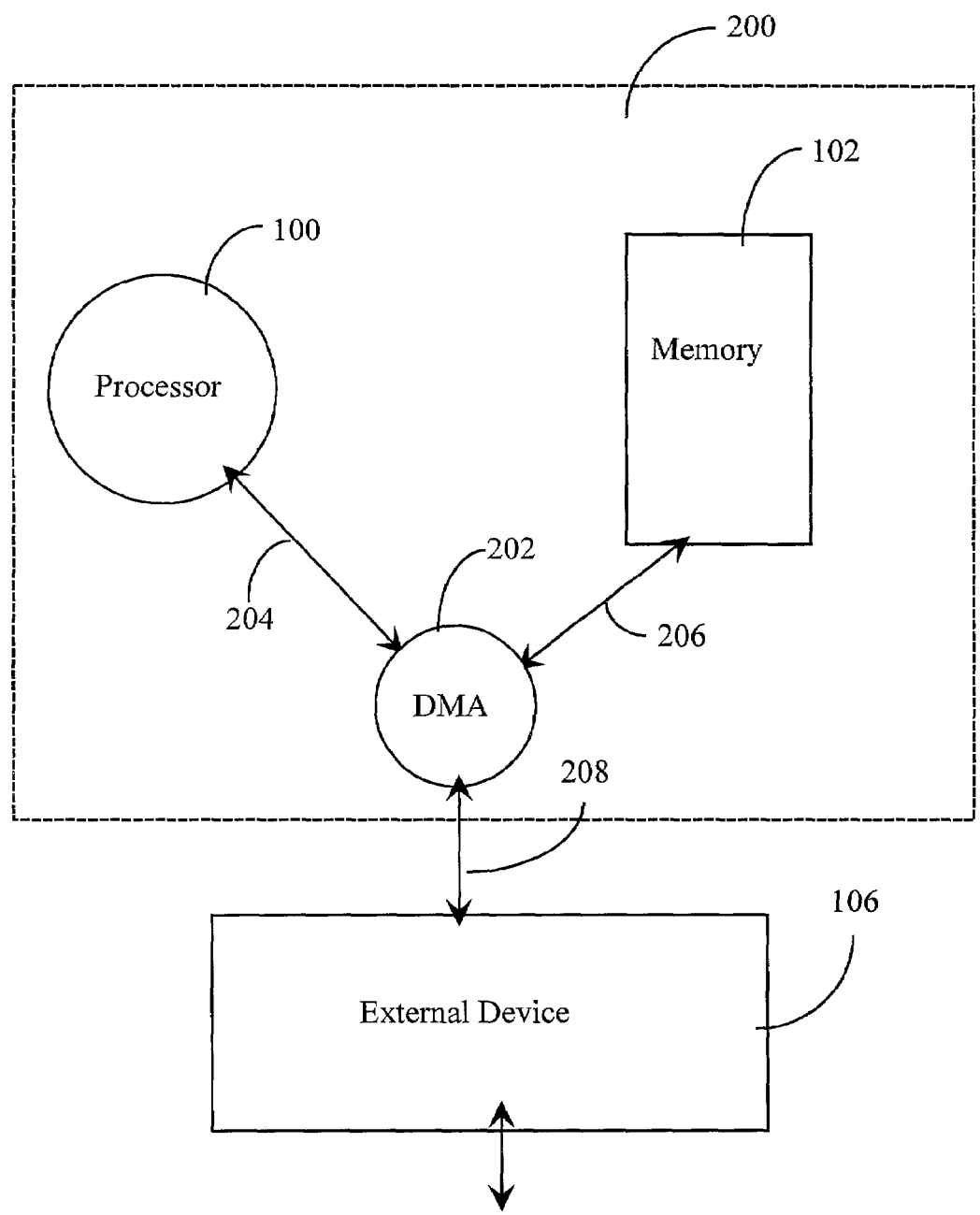
FIG. 2 is a simplified diagram of memory management by direct memory access in the prior art.

FIG. 2 is a simplified diagram of a processor system 200 in the prior art comprising a processor 100, a memory 102 and a direct memory access (DMA) device 202. This is the second of two systems by which data, in the conventional art, is brought into a system, processed, and sent out again, the first of which is by I/O operations as described just above. System 200 comprises a DMA device 202 which has built-in intelligence, which may be programmed by processor 100, for managing data transfers to and from memory 102. DMA device 202 is capable of compatible communication with external device 106, and of moving blocks of data between device 102 and 106, bi-directionally. The actual data transfers are handled by DMA device 202 transparently to processor 100, but processor 100 must still perform the memory mapping tasks, to know which regions of memory are occupied with data that must not be corrupted, and which regions are free to be occupied (overwritten) by new data.

In the system of FIG. 2 DMA processor 100 programs DMA device 202. This control communication takes place over path 204. DMA device 202 retrieves and transmits data to and from device 106 by path 208, and handles data transfers between memory 102 and processor 100 over paths 204 and 206.

In these descriptions of prior art the skilled artisan will recognize that paths 204, 206 and 208 are virtual representations, and that actual data transmission may be by various physical means known in the art, such as by parallel and serial bus structures operated by bus managers and the like, the bus structures interconnecting the elements and devices shown.

Figure 3:
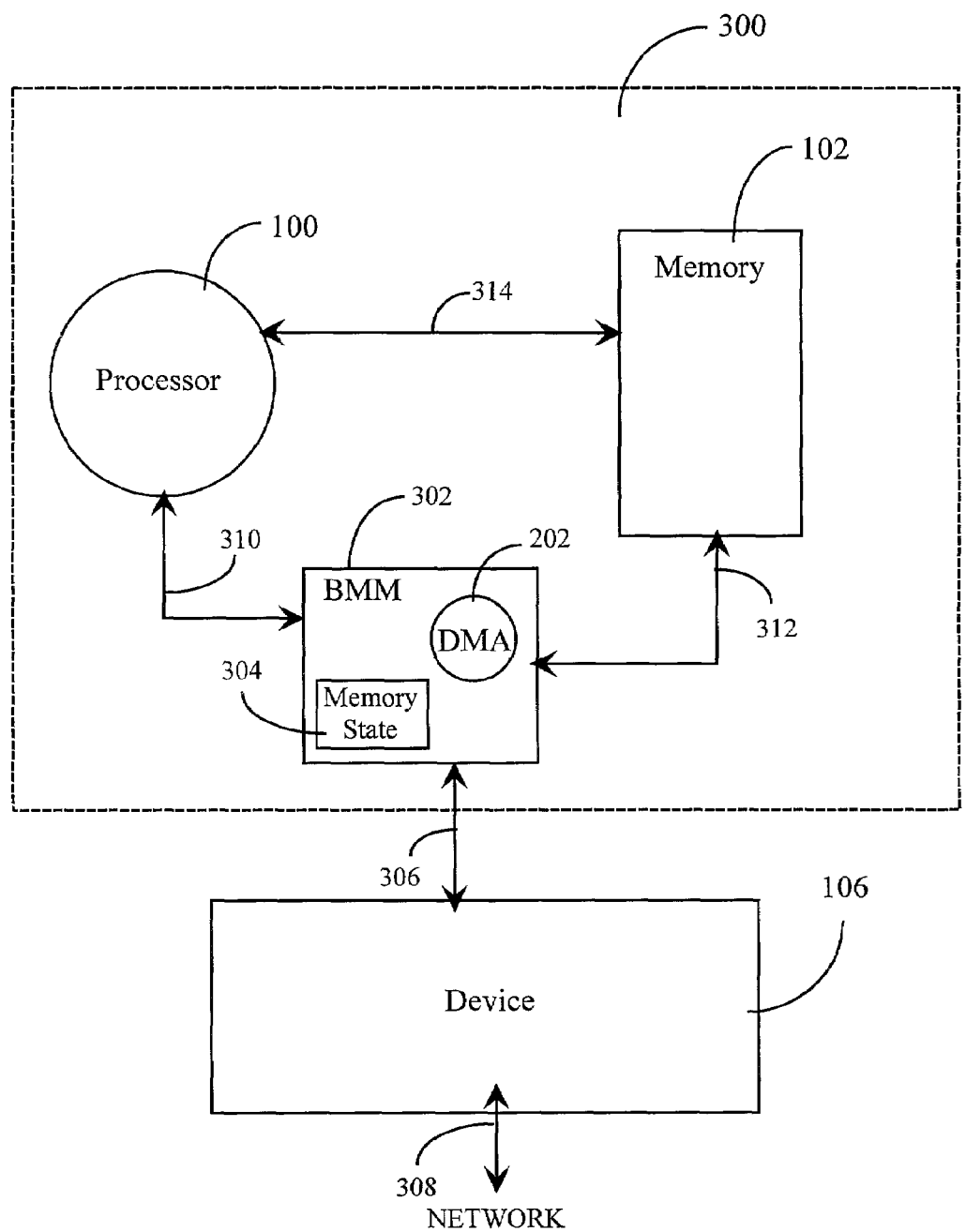
FIG. 3 is a diagram of memory management by a Background Memory Manager in a preferred embodiment of the present invention.

FIG. 3 is a schematic diagram of a system 300 including a Background Memory Manager (BMM) 302 according to an embodiment of the present invention. BMM 302 a hardware mechanism enabled to manage the memory in the background, i.e. with no intervention of the processor to decide where the data structure will be stored in the memory. Thus, the processor can utilize its resources for tasks other than to manage the memory.

The present invention in several embodiments is applicable in a general way to many computing process and apparatus. For example, in a preferred embodiment the invention is applicable and advantageous in the processing of data packets at network nodes, such as in routers in packet routers in the Internet. The packet processing example is used below as a specific example of practice of the present invention to specifically describe apparatus, connectivity and functionality.

In the embodiment of a packet router, device 106 represents input/output apparatus and temporary storage of packets received from and transmitted on a network over path 308. The network in one preferred embodiment is the well-known Internet network. Packets received from the Internet in this example are retrieved from device 106 by BMM 302, which also determines whether packets can fit into available regions in memory and exactly where to store each packet, and stores the packets in memory 102, where they are available to processor 100 for processing. Processor 100 places results of processing back in memory 102, where the processed packets are retrieved, if necessary, by BMM on path 312 and sent back out through device 106.

In the embodiment of FIG. 3 BMM 302 comprises a DMA 202 and also a memory state map 304. BMM 302 also comprises an interrupt handler in a preferred embodiment, and device 106 interrupts BMM 302 when a packet is received. When a packet is received, using DMA 202 and state map 304, the BMM performs the following tasks:

1. Decides whether a data structure fits into the memory. Whether the structure fits into memory, then, is a function of the size of the data packet and the present state of map 304, which indicates those regions of memory 102 that are available for new data to be stored.
2. If the incoming packet in step 1 above fits into memory, the BMM determines an optimal storage position. It was described above that there are advantages in sequential storage. Because of this, the BMM in a preferred embodiment stores packets into memory 102 in a manner to create a small number of large available regions, rather than a larger number of smaller available regions.
3. BMM 302 notifies processor 100 on path 310 when enough of the packet is stored, so that the processor can begin to perform the desired processing. An identifier for this structure is created and provided to the processor. The identifier communicates at a minimum the starting address of the packet in memory, and in some cases includes additional information.
4. BMM updates map 304 for all changes in the topology of the memory. This updating can be done in any of several ways, such as periodically, or every time a unit in memory is changed.
5. When processing is complete on a packet the BMM has stored in memory 102, the processor notifies BMM 302, which then transfers the processed data back to device 106. This is for the particular example of a packet processing task. In some other embodiments data may be read out of memory 102 by MM 302 and sent to different devices, or even discarded. In notifying the BMM of processed data, the processor used the data structure identifier previously sent by the BMM upon storage of the data in memory 102.
6. The BMM updates map 304 again, and every time it causes a change in the state of memory 102. Specifically the BMM de-allocates the region or regions of memory previously allocated to the data structure and sets them as available for storage of other data structures, in this case packets.

It will be apparent to the skilled artisan that there may be many alterations in the embodiments described above without departing from the spirit and scope of the present invention. For example, a specific case of operations in a data packet router was illustrated. This is a single instance of a system wherein the invention may provide significant advantages. There are many other systems and processes that will benefit as well. Further, there are a number of ways BMM 302 may be implemented to perform the functionality described above, and there are many systems incorporating many different kinds of processors that might benefit.

Low Fragmentation Data Storage

In the following described examples memory management is accomplished in a dynamic multi-streaming processor know to the inventors as XCaliber, which has been described in one or more of the documents incorporated in the cross-reference section above.

Figure 4:
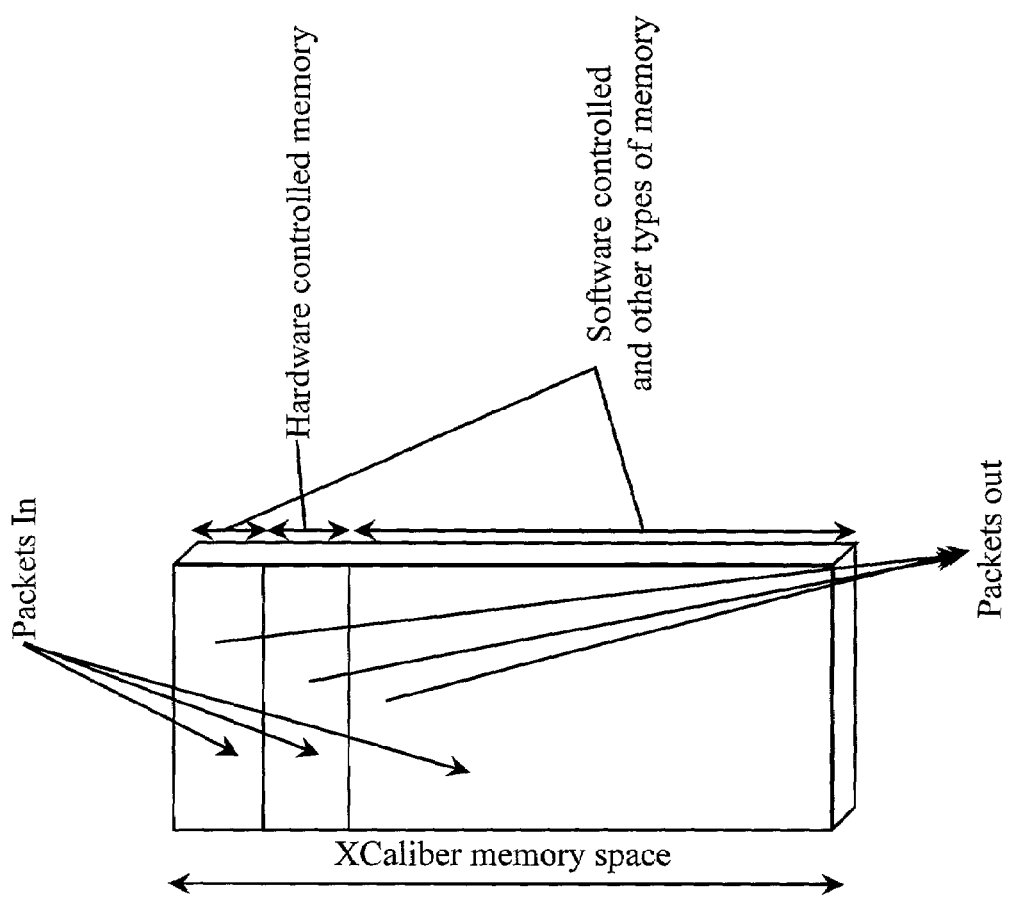
FIG. 4 is a block-diagram illustrating a hardware-controlled memory portion of a total processor memory.

FIG. 4 is a simplified diagram of memory space managed by XCaliber according to an embodiment of the present invention. Shown in the diagram are sections of memory space of the XCaliber multi-streaming processor that are hardware controlled, software controlled, and other types of memory not specifically described. In this example, a specific section is labeled Hardware Controlled. The memory space of this section is analogous to LPM 219 described with reference to FIG. 2 of Ser. No. 09/737,375 or memory 102 described with reference to FIG. 3 of Ser. No. 09/602,279. In this example, only a specified section of the total available memory of XCaliber is designated as hardware-controlled.

Also indicated by directional arrows in this example are Packets In that are received at the processor from a network such as, for example, the well-known Internet network. Packets Out, similarly indicated in this example by directional arrows, indicate data packets that have been processed by XCaliber and are being uploaded for routing to designated destinations either internal to the router or over a network or networks, which may include the Internet network, to other routing points.

The section of hardware-controlled memory illustrated herein is controlled by hardware that is provided according to a preferred embodiment of the present invention and enhanced to manage the memory according to a provided protocol. In an embodiment of this invention it is preferred that incoming data packets are stored into and read out of hardware controlled memory so that the central processing unit (CPU) or other processing resources do not have to perform costly operations involved in storing and reading out the data.

Although it is not explicitly indicated in this example, but is further described below, the section of memory labeled as hardware-controlled memory is divided into a plurality of manageable blocks. It is possible in an embodiment of this invention that software can control none, one, or more memory blocks and leave those blocks not controlled by software to control of the hardware algorithm. Configuration flags are provided for indicating assigned software control of any one or more of memory blocks. When such a flag is set the hardware controller will not store any incoming data packets into the flagged block.

The protocol provided in embodiments of this invention, defined by a specific algorithm, determines if any incoming data packets fit into any hardware-controlled blocks of memory. If incoming data packets fit into any of the hardware-controlled blocks, the hardware algorithm enables a computation to determine which blocks within the hardware-controlled memory will be selected that will accommodate incoming data packets.

The novel protocol of the present invention introduces a concept of virtual and atomic pages as data storage containers of the hardware-controlled memory. In a preferred embodiment, Virtual pages comprise a number of atomic pages. A goal of the present invention is to be able to reduce fragmentation that typically occurs when queuing and de-queuing data packets.

Figure 5:
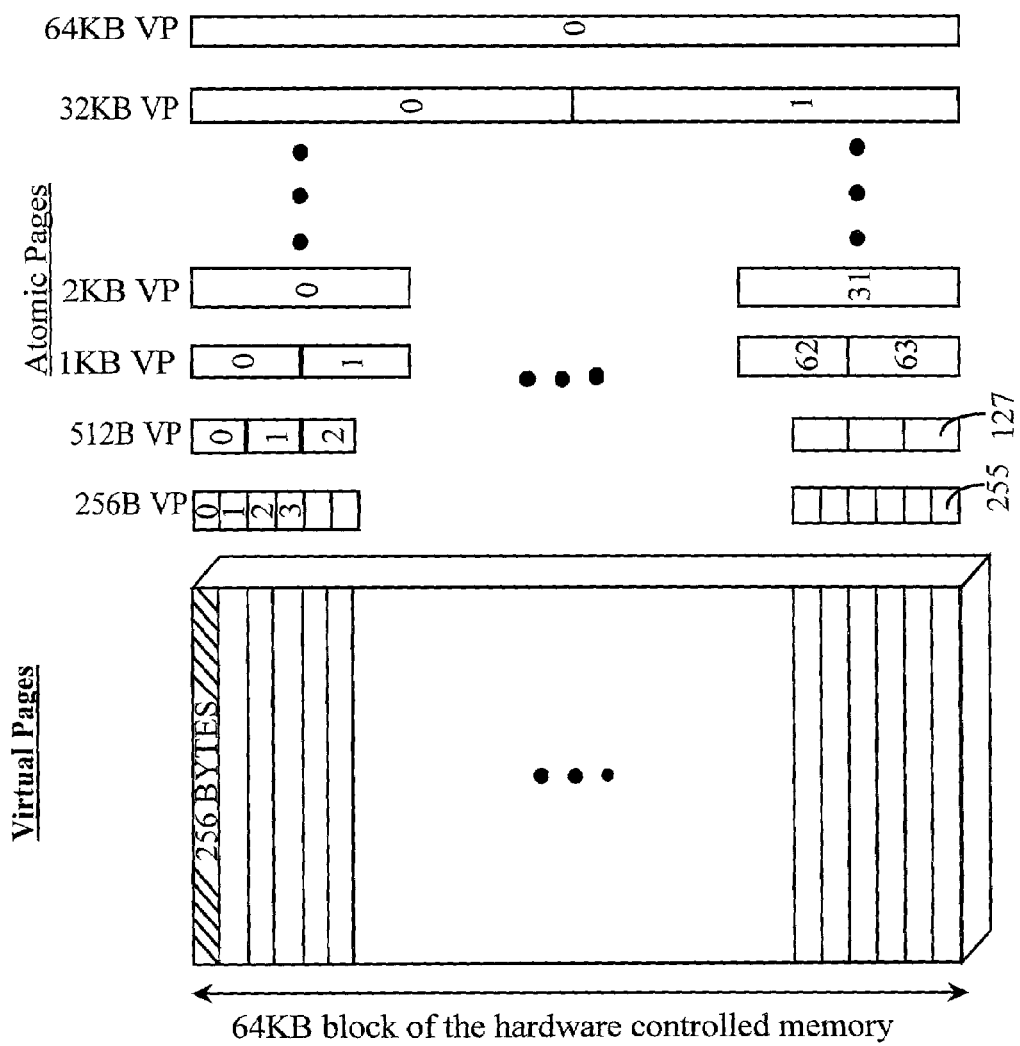
FIG. 5 is a block-diagram illustrating layout of virtual pages for a division of the hardware-controlled memory of FIG. 4 according to an embodiment of the present invention.

FIG. 5 is a block-diagram illustrating an example of a virtual page according to an embodiment of the present invention. This example illustrates just one of a plurality of divided sections of the hardware-controlled memory described above with reference to FIG. 4.

In actual practice, the hardware-controlled portion of memory of FIG. 4 is divided into 4 blocks each having 64 Kb total memory space. Therefore, a total size of the hardware-controlled memory of FIG. 4 is 256 Kb. This should, however, not be construed as a limitation of the present invention, as there are a number of possible division schemes as well as possible differing amounts of provided on-board memory. In this example only a single block of 64 Kb is represented for simplicity in description.

The 64 KB block of this example comprises a plurality of atomic page divisions having 256 bytes of memory space each. Therefore, there are in this example, 256 atomic pages making up a single 64 Kb block and 1024 atomic pages defining the four 64 Kb divisions of the total hardware-controlled memory referred to in the example of FIG. 4 above.

Graphically represented to the right of the 64 Kb memory block in this example are columns representing some possible allocated sizes of virtual pages. For example, a 256-byte virtual page (VP) size may exist that comprises a single atomic page (1:1) thus providing 256 (0–255) VPs per 64 Kb block. A 512-byte VP size may exist with each VP comprising 2 atomic pages (2:1) thus providing 128 (0–127) VPs per block. Similarly, reading further columns to the right, virtual pages may comprise 1 Kb of memory (0 through 63 atomic pages), 2 Kb of memory (0 through 31 atomic pages) and so on, according to power of 2 increments, up to a single 64 Kb VP comprising the entire 64 Kb block.

An enhanced hardware mechanism is provided and termed HAL by the inventor, and is subsequently referred to as HAL in this specification. HAL computes and maintains a flag for each virtual page within a controlled memory block in order to determine whether a virtual page has been allocated for data storage or not. The status, including size of all atomic pages is, of course, known to HAL to make computations regarding whether or not to store an incoming data packet in a particular space.

Figure 6A:
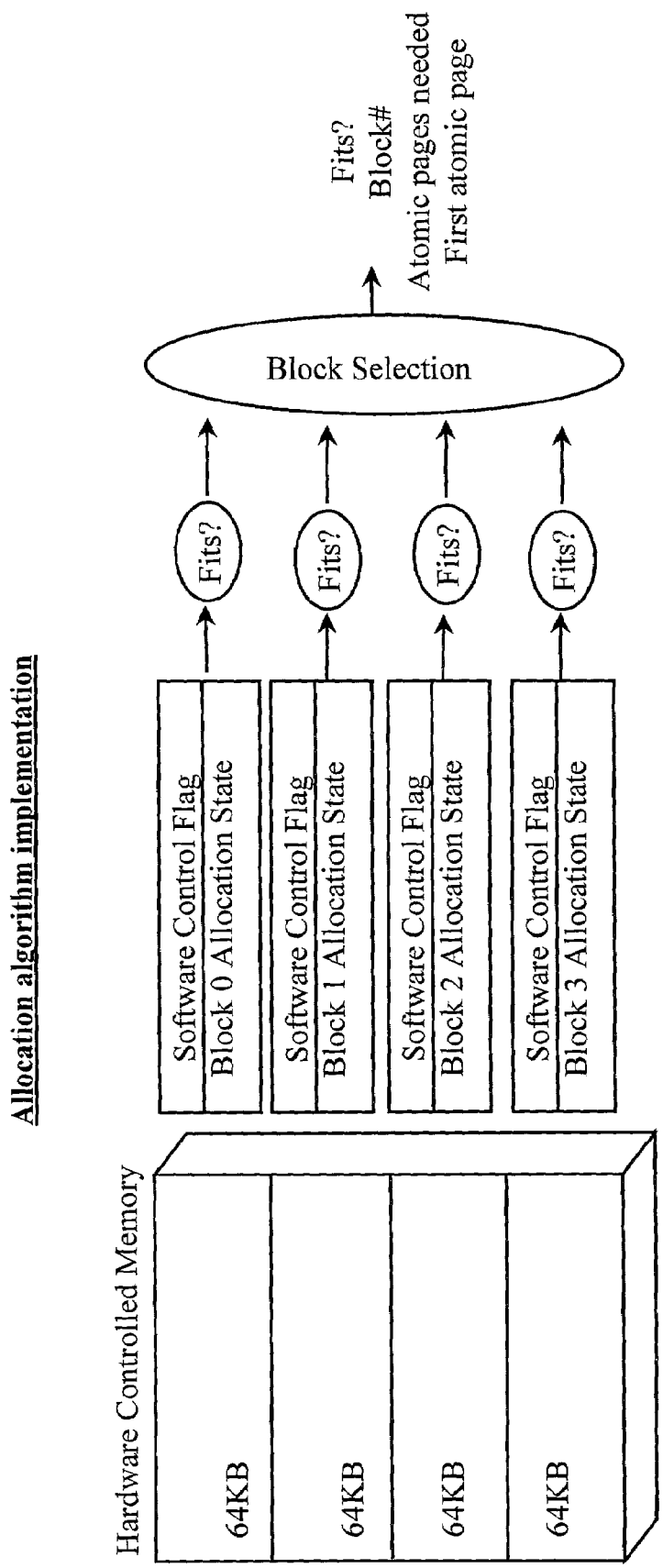
FIG. 6a is a block-diagram illustrating a Fits Determination logic according to an embodiment of the present invention.

FIG. 6a is a block diagram illustrating a first part of a two-part process of storing data packets into hardware-controlled memory according to an embodiment of the present invention. In the two-part function, HAL makes a determination whether a particular incoming data packet fits into any of the blocks of the hardware-controlled memory. If a packet fits, it is determined how many atomic pages of memory space will be needed to store the data packet. After packet storage, the used space is marked as allocated for storage of the packet. When the packet is read out of queue, the formerly allocated space is then de-allocated or marked as free space for consideration in future storage.

As was previously described above, the hardware controlled memory is divided into a plurality blocks of a fixed size. In practice in this example, total memory controlled by hardware (HAL) is 256 KB divided into 4 sub-blocks of 64 KB each. As described with reference to FIG. 5 of this specification, each 64 KB block is divided into smaller sub-blocks of atomic pages of 256 bytes each, which are used to construct virtual pages.

At left in FIG. 6a, there is illustrated 4 64 Kb blocks of memory, which taken together equate to a total memory that is controlled by HAL. Each block, as previously described, may be hardware or software controlled. If a block is software controlled, it will be identified as such and HAL will not utilize the block for packet storage. To the right of the 4 64 Kb blocks, there is illustrated a state of indication for each block. For example, an area is set aside to indicate if a block is software controlled. If this area does not indicate by flag that it is software controlled, then an allocated/de-allocated indication will be present. This is indicated by "Block 0 state through block 3 state. It is noted herein that computation by HAL is performed in parallel for each 64 Kb block.

If it is determined by HAL that there is available hardware controlled memory and that one or more blocks have sufficient space that is de-allocated, or does not hold data, then HAL determines if the packet fits into any of the eligible spaces. It is noted herein that the byte size of an incoming data packet is appended to the packet in this example in the first 2 bytes of the packet header. This is a convenience in a preferred embodiment, but is not limiting for purposes of the invention. In cases where no size is appended, the hardware algorithm would simple receive all of the packet, and when it detects that the packet has been completely received, it would compute the size of the packet. In this way, (either way) HAL may efficiently determine eligible spaces to store the packet. In this scheme, data packets are stored consecutively and a goal is to have all of a packet contained in a virtual page to reduce fragmentation.

Blocks are selected for storage based on eligibility, and in some cases priority. Information generated by HAL in case of packet fit includes a block #, the total number of atomic pages required to store the packet, and the location identifier of the first atomic page marking the beginning of the stored data packet. Knowing the first atomic page and the size of the data packet stored is sufficient to simplify reading the packet out of the hardware-controlled memory, since packets are consecutively stored.

Whether hardware or software controlled, status of selected blocks of memory must be computed and maintained by whichever entity (hardware or software) is controlling selected blocks of memory.

To select appropriate blocks of memory, HAL must keep track of regions of memory wherein active data is stored and regions that are free and available for storage. Once data packets are sent out to another device or location, those areas of memory associated with that data are de-allocated and available to be used again for storage of new data packets to be stored into the memory. Once fit determination is made, the HAL records a block number, atomic pages needed for storage, and at least a first atomic page number as a data identifier, and provides that data identifier to the multi-streaming processor for management of data. If a fit determination cannot be made, the controlling entity (HAL or software) may have the option of storing data packets in external storage memory or dropping data packets.

Figure 6B:
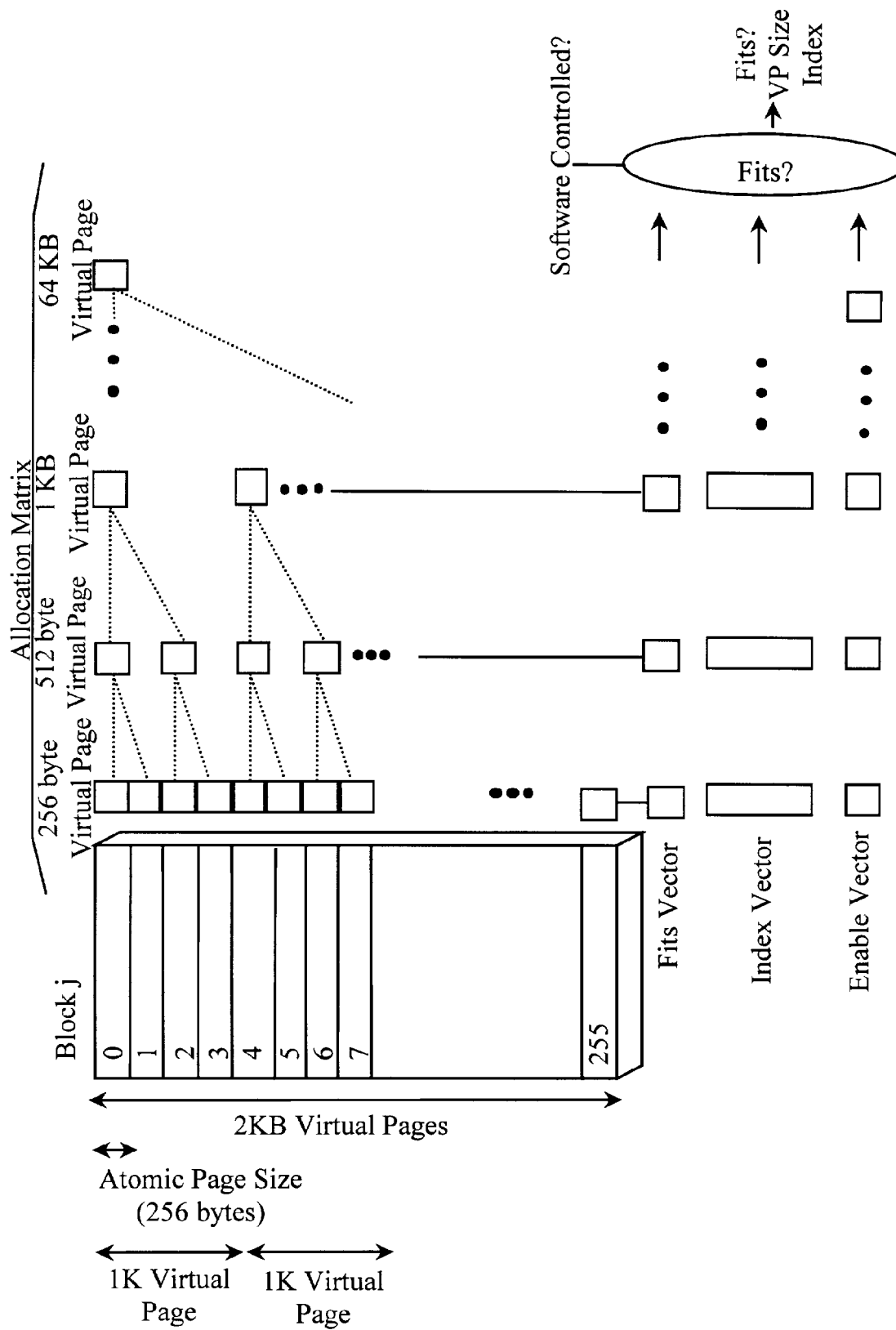
FIG. 6b is a block diagram illustrating an allocation matrix according to an embodiment of the present invention.

FIG. 6b is a block-diagram illustrating a virtual page allocation matrix of atomic pages needed to store data packet and the re-computation (allocated/de-allocated) of the state of virtual pages. Allocation of atomic pages is accomplished by fit determination logic established by the allocation matrix that is comprised of the state of each of all virtual pages per block. Computation is updated each time one or more atomic pages is allocated or de-allocated and is an input back into the determination logic.

The allocation matrix maintains computation of allocated and de-allocated virtual pages relative to 256 byte, 512 byte, 1 Kb, and other power-of-two increments up to a 64 Kb virtual page. Allocated and De-allocated state information is submitted as input to the fits determination logic for each packet as described above.

In this example, Block j has 0–255 atomic pages representing the smallest increment of 256 bytes. The power-of-two increments of construction are 256B virtual pages, 512 B virtual pages, 1 KB virtual pages, up to a 64 KB virtual page. The instant mapping scheme selectable by power of two increments is a programmable feature that may be programmed on the fly during packet processing.

Motivation for changing the memory mapping scheme with regard to the size of virtual pages allocated for packet storage may, in one embodiment, be derived from statistical averaging of the size of data packets entering a data port over a given, and also programmable, period of time. A goal of the present invention is to continually select the best mapping scheme that enables data storage with minimum fragmentation. Therefore, the way that the local packet memory (hardware controlled) is mapped can vary according to need. The exact criteria for determining when to change the mapping scheme may be established using a threshold scheme that automatically triggers a dynamic re-mapping of hardware-controlled memory. Because of this flexibility, which is not available in prior art memory addressing schemes, fragmentation may be kept to a minimum. However, a trade-off exists in that using a power of 2 to define selectable VP sizes is not necessarily the best way to reduce fragmentation. It is utilized in a preferred embodiment because it greatly simplifies computation, requiring minimum circuitry, providing for a smaller and faster chip implementation.

The primary factors of concern in this specification are an Allocation Matrix, a Fits Vector, and an Index Vector. These primary factors are defined as follows:

AllocationMatrix[VPSize][VPIndex]: indicates whether virtual page number VPIndex of size VPSize is already allocated or not.

FitsVector[VPSize]: indicates whether a block has at least one non-allocated virtual page of size VPSize.

IndexVector[VPSize]: if FitsVector[VPSize] is asserted, IndexVector[VPSize] contains an index of a non-allocated virtual page or pages of size VPSize.

Determination of VP size for any one of a plurality of hardware managed blocks is dynamically programmed and, in some cases, re-programmed according to learned results of operation as previously described above. A factor defining this ongoing determination is termed EnableVector[VPSize].

The above-described factors always remain in an undefined state for any block managed by software instead of hardware.

A supporting algorithm expressed in software language for the fits determination logic (for a data packet of size s bytes) is:

```
1) Fits logic: Check, for each of the blocks, whether the data packet
   fits
       in or not. If it fits, remember the virtual page size and the num-
       ber of
       the first virtual page of that size.
           For All Block j Do (can be done in parallel):
               Fits[j] = (s <= VPSize) AND FitsVector[VPSize]
AND
               Not SoftwareOwned
                   where VPSize is the smallest possible page
                   size.
```

-continued

```
           If (Fits[j])
               VPIndex[j] = IndexVector[VPSize]
               MinVPS[j] = VPSize
           Else
                       MinVPS[j] = <Infinit>
2) Block selection: The blocks with the smallest virtual page (enabled
   or not) that is able to fit the data packet in are candidates. The
   block
   with the smallest enabled virtual page is selected.
       If Fits[j] = FALSE for all j Then
               <Packet does not fit in hardware-controlled
       memory>
           Else
               C = set of blocks with smallest MinVPS AND
Fits[MinVPS]
               B = block# in C with the smallest enabled virtual
page
               (if more than one exists, pick the smallest
block number)
               If one or more blocks in C have virtual pages enabled
Then
               Index = VPIndex[B]
               VPSize = MinVPS[B]
               NumAPs = ceil(S/256)
               packetPage = (B*64KB + Index*VPSize) >>
8
           Else
               <Packet does not fit in hardware-controller
               memory>
```

A packetPage is an atomic page number of the first atomic page that a data packet will occupy in hardware-controlled memory. The packetPage is offset within hardware-controlled memory and can be used to quickly identify and access all data of a packet stored consecutively after that page. The total number of atomic pages (NumAPs) needed to store a data packet is calculated and allocated. Data packet size is determined by examining the first 2 bytes of the packet header as previously described. Allocation of atomic pages for a selected block (j) is determined as follows:

The allocation status of atomic pages in AllocationMatrix [Apsize][j . . . k], j being the first atomic page and k the last one (k−j+1=NumAPs), are set to be allocated.

The allocation status of virtual pages in AllocationMatrix [r][s] is updated following the mesh structure shown in FIG. 6b: a $2^{k+1}$-byte virtual page is allocated if any of the two $2^k$-byte virtual pages that it is composed of is allocated.

Figure 7A:
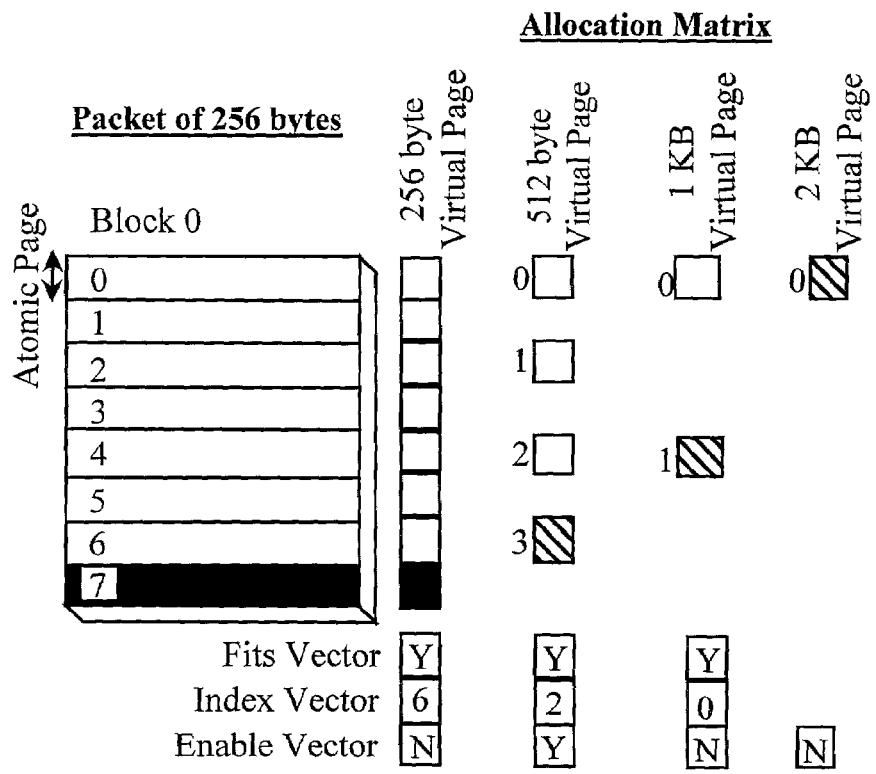
FIGS. 7a through 8d are block-diagrams illustrating a sequence of packet storage involving a plurality of different sized data packets according to an embodiment of the present invention.

FIGS. 7a through 8d are block diagrams illustrating allocation of atomic (and virtual) pages by HAL. The collective diagrams numbering 8 in total are associated in an ongoing sequence of page allocation and packet storage. The 8 diagrams are further associated in sets of two memory blocks each, for example, FIGS. 7a and 7b representing a first sequence utilizing 2 memory Blocks 0 and 1. In actual practice, there are 4 memory blocks within hardware-controlled memory. The inventor illustrates 2 Blocks 0 and 1, each comprising 2 KB of memory for purpose of simplifying explanation.

Referring now to FIG. 7a, assume that Block 0 is hardware controlled, empty of data, and selected for packet storage. The size of a packet for storage is 256 bytes as is indicated above the block. Options for virtual memory allocation in variable sized virtual pages are displayed in columns to the right of Block 0 in increments of powers of 2. The smallest size page is an atomic page of 256 bytes. Therefore in Block 0 there are 8 atomic page divisions 0–7 adding up to 2 KB (total memory). In the first column labeled 256-byte Virtual Page, there is one page available (0–7) for each atomic division 0–7 because they are of the same size. In the next column labeled 512-byte Virtual Page, there are only 4 available virtual pages (0–3) representing total memory because of the power of 2 rule. The remaining columns labeled 1 KB Virtual Page and 2 KB Virtual Page (VP) are presented accordingly using the power of 2 rule.

Immediately below Block 0 is a columned table representing values of three Vectors described previously in this specification. These are, reading from top to bottom, Fits Vector, Index Vector, and Enable Vector. The values presented in the table are associated with the Virtual Page columns. In this example, atomic division 7 is crosshatched indicating current cycle VP allocation of a 256-byte packet. Indication of the VP allocation by cross-hatching is extended across the presented columns in each VP Size category. The cross-hatching in this example indicates that the corresponding atomic page is allocated. The virtual page that contains this atomic page is then not available.

HAL computes and selects the most optimum storage space for the packet based on determined and chosen values represented in the Vector table for each column. The Enable Vector is a preprogrammed constant programmed for each power of 2 columns. The values of yes (Y) or no (N) represented for each column indicate whether or not the function of looking for an available Virtual Page in that column is enabled or not. The specific determination of enabling or disabling consideration of a specific size Virtual Page during a computation cycle depends on outside considerations such as knowledge of average size packets arriving at a port over a given period of time, and any desire to reserve certain size Virtual Pages in a given Block for storage of a specified size or size range of data packets. The Enable Vector is a programmable optimization tool to enable optimum data storage with even less fragmentation.

The Fits Vector is a determination of whether a packet will fit into an available Virtual Page as determined by known size of the packet, and the Index Vector is a pointer to a next available Virtual Page in each size column for fitting a packet. While the Fits Vector is result-oriented (computed result), the Index Vector is selectable in case there is a plurality of Index slots empty of data and available for packet storage. For optimum data storage the last available VP that fits a packet is chosen for storage. It could also be the first available. Either way will work, as long as it is either the last available or the first available.

In this example, it is determined that for selected Block 0, a packet of the size of 256-bytes will fit in a 256-byte virtual page (indicated by cross hatching). In the event of storage of the packet in a 256-byte virtual page, an Index Vector of 6 (or the next 256-byte slot) is flagged for the next available "page" in memory for a next 256-byte packet. This represents the most optimum storage use through consecutive storage and no fragmentation, using the scheme of power-of-two virtual pages and fixed size of atomic pages. The packet will also fit in a 512-byte virtual page, a 1 KB virtual page, and in a 2 KB virtual page. A tabled Y for Enable Vector indication is not required in the case of a 2 KB virtual page as that page represents the total memory selected.

If the 256-byte packet is stored in a 512 Virtual Page it would occupy a block in that column representing atomic divisions 6 and 7 within Block 0 according to power of 2. In this case the Vectors read Y=fits, 2 (chosen as pointer for next available 512-byte Virtual Page), and Y=enabled for consideration. If the packets coming in average between 256 and 512 bytes, it is logical to reserve 512 byte pages as indicated by Enable Vector value of Y for that column. It is reminded that there are three other blocks in actual practice that can be hardware controlled.

Figure 7B:
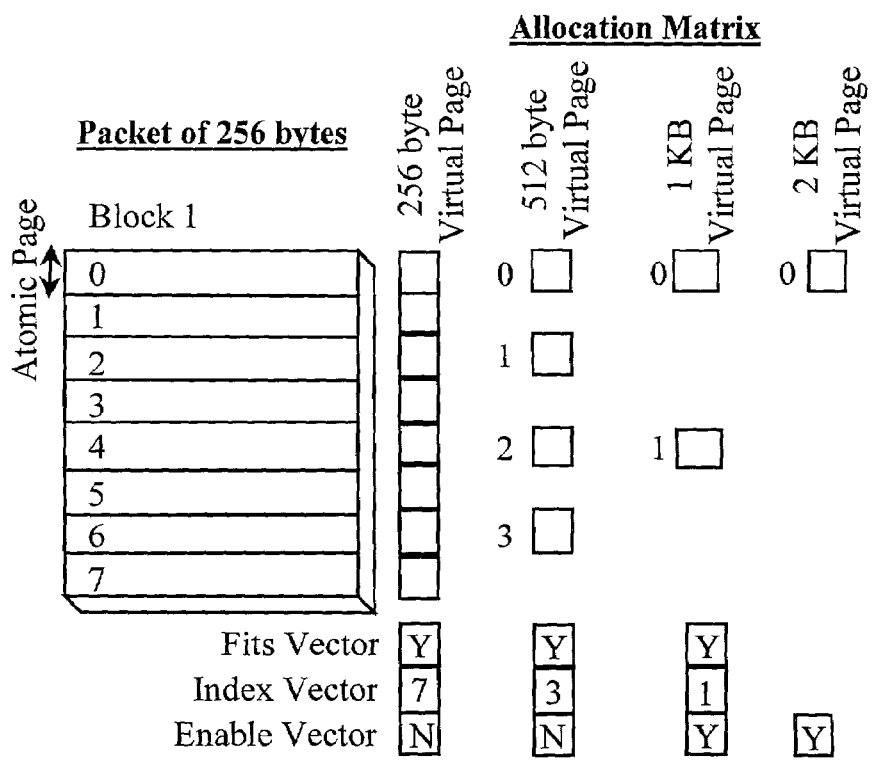

Referring now to FIG. 7*b*, Block 1 represents the other hardware-controlled memory block of this example. The absence of any activity designated by cross-hatching simply means that Block 1 has not been selected for packet storage in the first cycle.

Figure 7C:
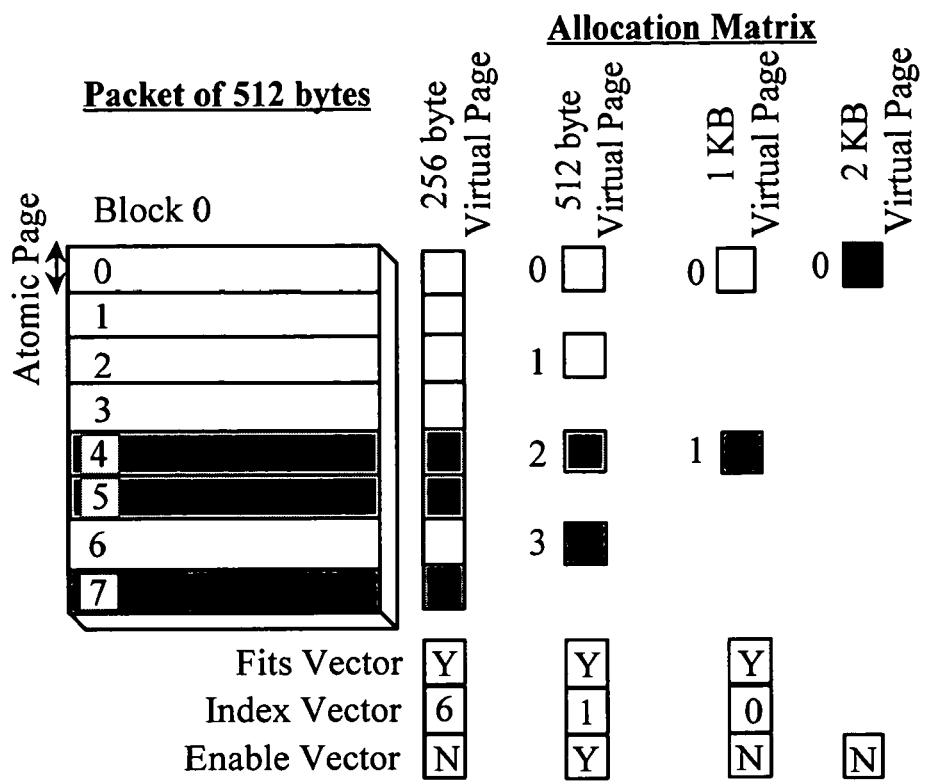
Figure 7D:
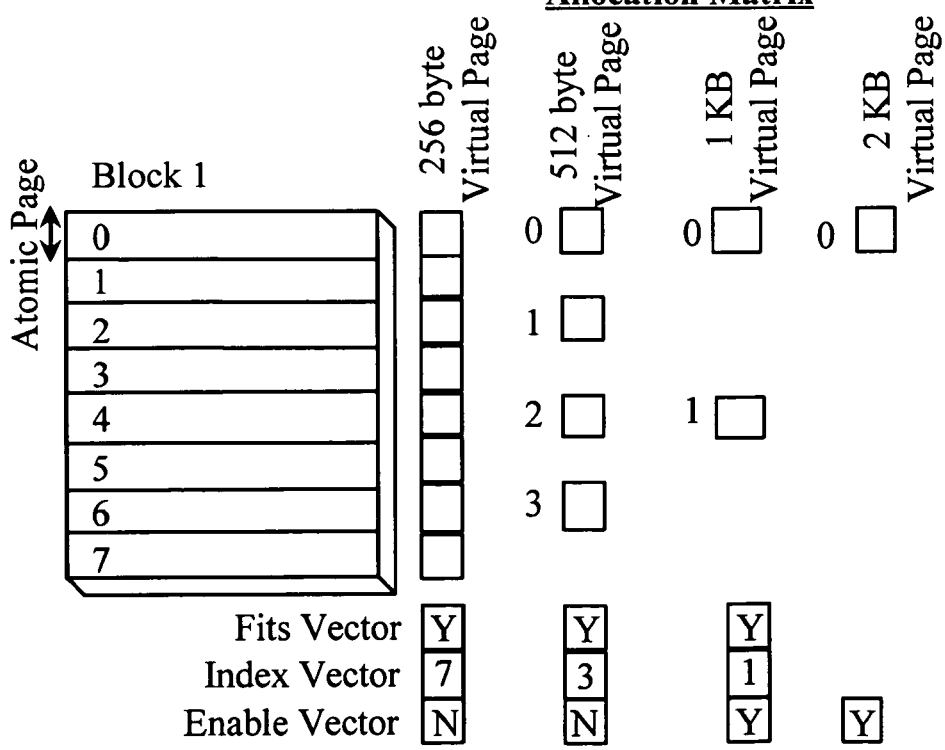

Referring now to FIG. 7*c*, the activity represented in FIG. 7*a* is present in Block 0 as double crosshatched blocks for the packet of 265-bytes. For a next packet of 512-bytes in the next computation cycle, Block 0 in the column 512-bytes has atomic pages 4 and 5 allocated for receiving the 512-byte packet. This allocation resulted from the previous index vector of 2 represented with respect to FIG. 7*a*. In this sequence, only the index vector value of 1 in the 512-byte column has changed indicating that block as the next available 512-byte VP for a next packet of that size or smaller. Referring now to FIG. 7*d*, an absence of cross-hatching indicates that Block 1 was not selected for packet storage in the current cycle.

Figure 8A:
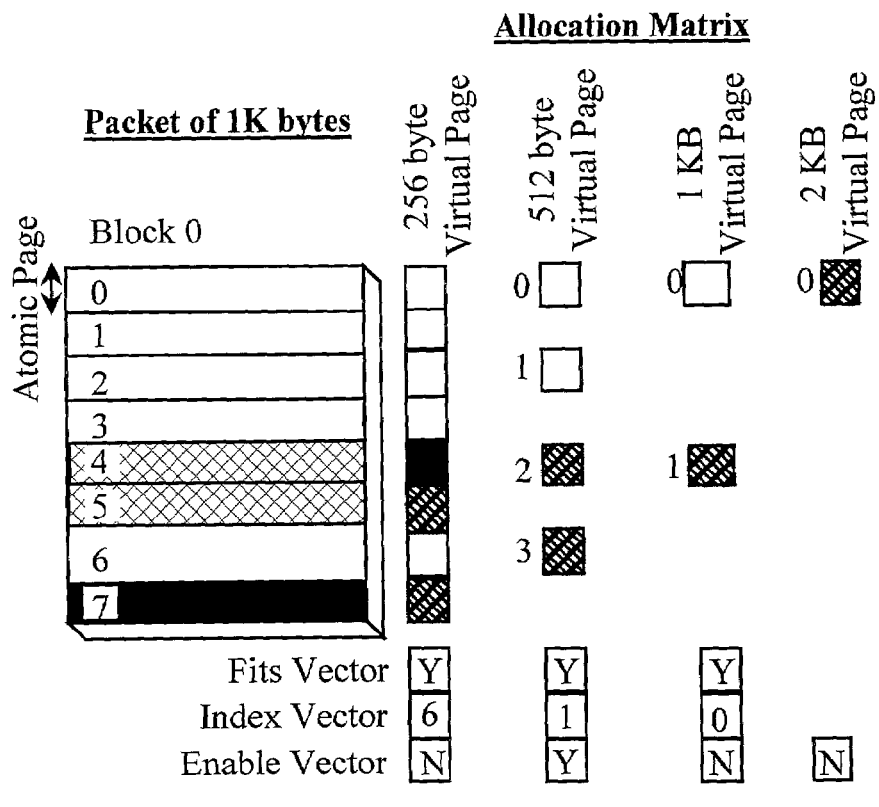

Referring now to FIG. 8*a*, the sequence now must deal with fits determination and allocation for a 1 KB data packet as is indicated above Block 0. In this example, the previous activity described with reference to FIGS. 7*a* (256-byte) and 7*c* (512-byte) is illustrated herein as double crosshatched blocks indicating past allocation and current ineligibility for consideration in this current cycle. It is also noted that neither column (1 KB) nor column (2 KB) is enabled. Even though a 1 KB block may fit in the open VP in the 1 KB column, Block selection is deferred to Block 1 illustrated with reference to FIG. 8*b*. That is to say that Block 0 represented in FIG. 8*a* is not selected for storage of the 1 KB packet.

Figure 8B:
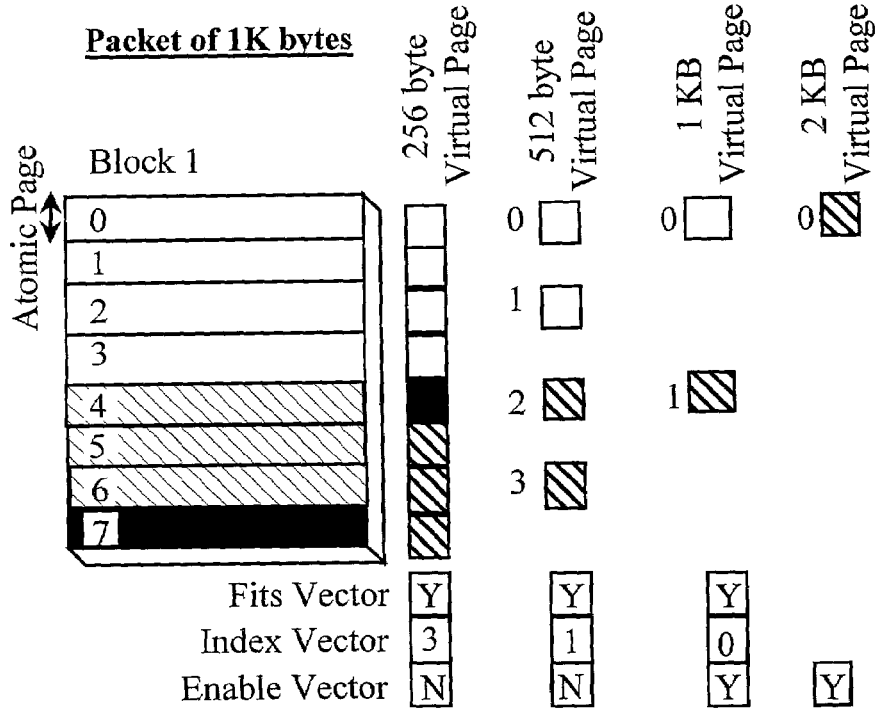

Referring now to FIG. 8*b*, Fits Vector is positive (Y) for all size columns. Atomic divisions 4–7 are allotted for storage of the 1 KB packet in the current cycle as indicated by crosshatching. Index Vector 3 represented in the 256-byte VP column indicates the next available storage index (VP) in the next cycle. It is noted herein that Enable Vector values are positive in the 1 KB and 2 KB columns. In the next cycle, there will be available 4 256-byte VPs (Index Vector 3), 2 512-byte VPs (Index Vector 1), and 1 KB VP (Index Vector 0), available for consideration for storage of a next packet. It is noted that VP 2-KB is not considered in the algorithm for a next cycle be cause it has been allotted.

Figure 8C:
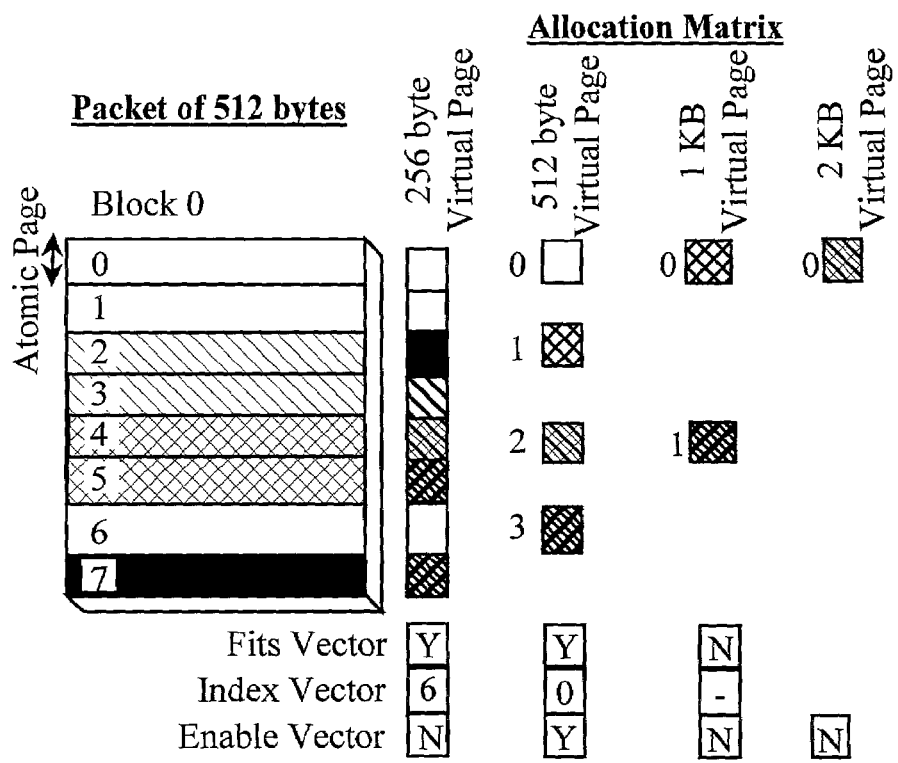
Figure 8D:
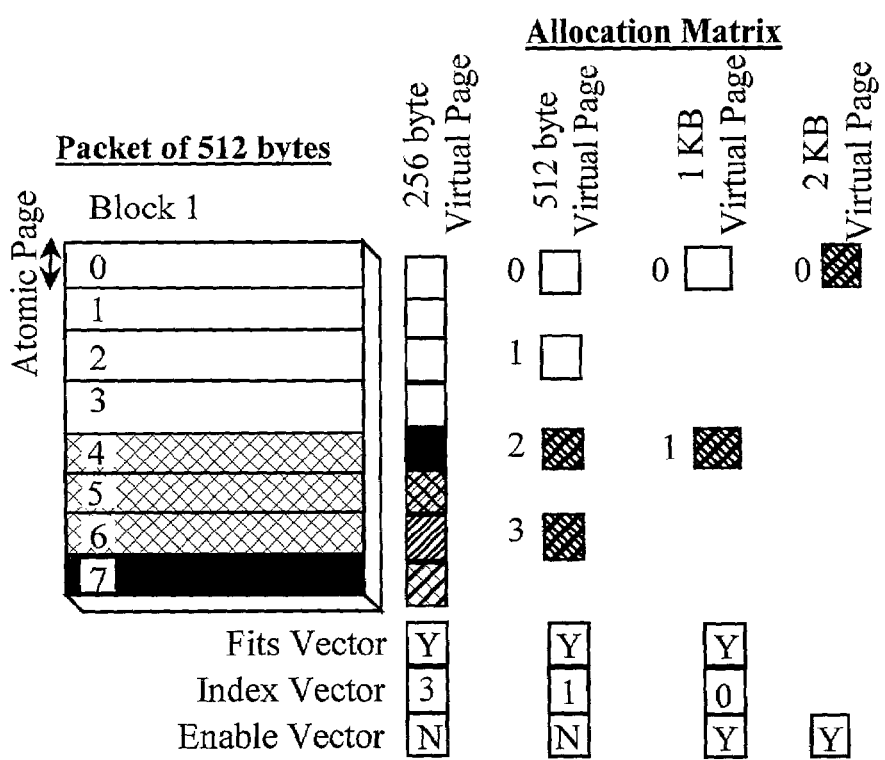

FIGS. 8*c* and 8*d* illustrate further operations involving packets of 512 bytes, and can be understood in light of the above descriptions.

Figure 9:
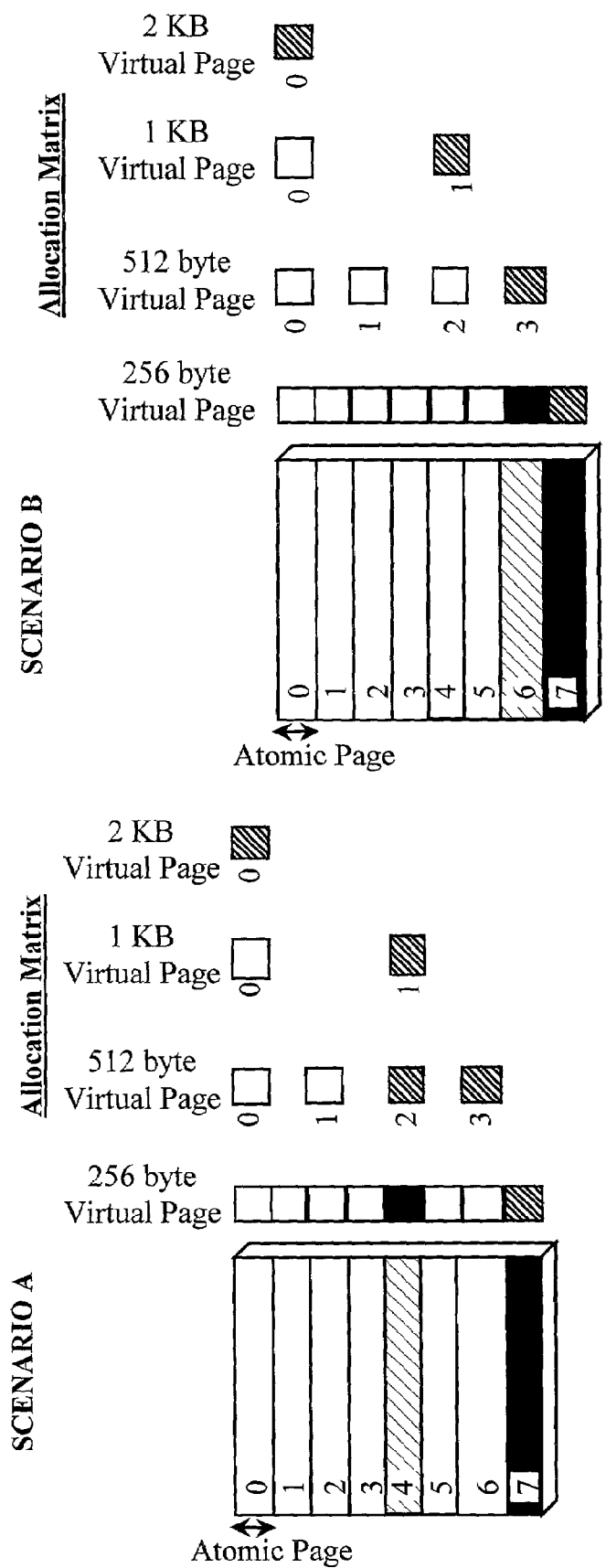
FIG. 9 is a block diagram illustrating a comparison between consecutive and non-consecutive data storage.

FIG. 9 is an illustration of how memory space is better utilized by consecutive storage according to an embodiment of the present invention. This example illustrated two scenarios, A and B, wherein two 256-byte data packets are stored in a block. In SCENARIO A, a 256-byte virtual page is randomly chosen, whereas in SCENARIO B, the largest index vector is always chosen. As can be seen, the block in SCENARIO A only allows two 512-byte virtual pages to be considered at a next round whereas the block in SCENARIO B allows three VPs. Both, however, allow the same number of 256-byte data packets since this is the smallest allocation unit. The same optimization may be obtained by choosing the smallest virtual page index number all the time.

It is noted herein that assignment of Virtual Pages as explained in the examples of FIGS. 7*a* through FIG. 9 is performed in parallel for all memory blocks of hardware-controlled memory that are not flagged for software control.

Packet Overflow Apparatus and Method

In one aspect of the present invention a method for overflowing data packets incoming into a data router is provided wherein, if the packets are deemed not suitable for hardware-controlled packet storage, then they are instead diverted to a memory controlled by software or some other external memory without disrupting packet information queuing and accounting procedures.

Figure 10:
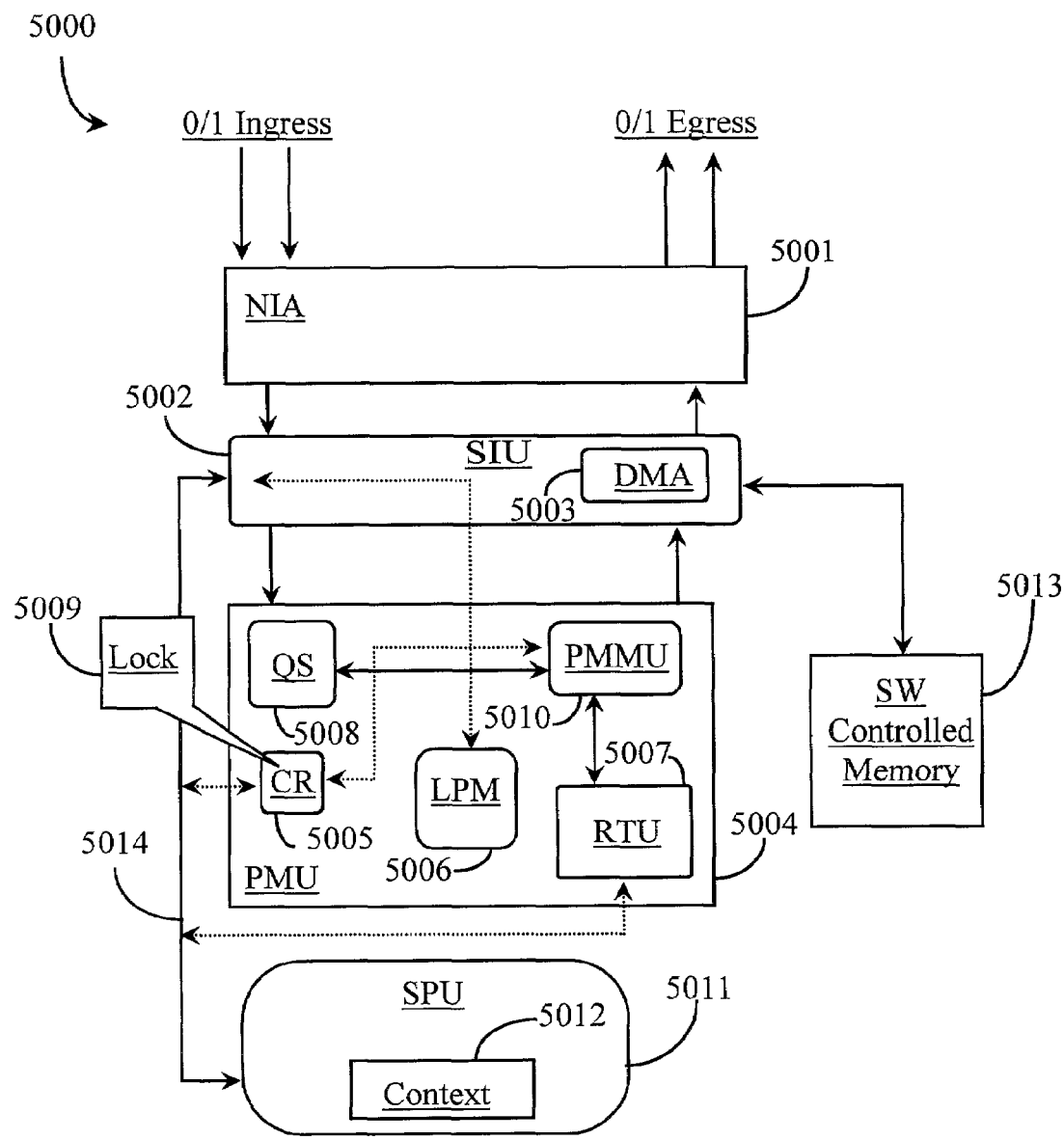
FIG. 10 is a block diagram illustrating various components and logical communication paths involved in packet overflow according to an embodiment of present invention.

FIG. 10 is a block diagram illustrating various components of a DMS processor 5000 and logical communication paths between components involved in a packet-overflow operation according to an embodiment of present invention. DMS processor 5000 comprises four basic functional units. These are a network interface (NI) 5001, a system interface unit (SIU) 5002, a packet management unit (PMU) 5004, and a streaming processor unit (SPU) 5011. These basic components making up processor 5000 are all described with reference to disclosure associated with FIGS. 1–3 of priority application Ser. No. 09/737,375. A goal of the present invention is to provide a method by which these components interact when necessary to conduct packet overflow without disturbing packet accounting.

The functional descriptions regarding components 5001, 5002, 5004, and 5011 are analogous to functions described with reference to FIGS. 1–3 of Ser. No. 09/737,375 and therefore will not be re-visited with much granularity herein in this specification except when to do so aids in understanding of the present invention. Those descriptions and the figures are also a part of the present specification.

NIA 5001 is an external interface for DMS 5000 in terms of network function. NIA 5001 has, at least one ingress station and a like number of egress stations. Not shown are in-bound and out-bound buffers. In this example, NIA 5001 is logically represented herein as having a 0/1 Ingress location and a 0/1 Egress station adapted for accepting data arriving from the network or another device, and for sending processed data back to the network or another device. In actual practice of the invention, each port on DMS 5000 is bi-directional and may operate at full or half duplex according to pre-configuration. The 0 in 0/1 represents a single device ID that is sending data into NIA 5001 for buffering (not shown). The 1 in 0/1 represents another single device ID that is sending data to DMS 5000. Similarly, Egress 1/0 represents buffered data being sent out of DMS 5000 according to their intended receiving devices. In one aspect, a sending and receiving device may be the same device receiving messages back from DMS 5000 after first sending data for processing.

SIU 5002 serves as a system interface between PMU 5004 and most other router components. A direct memory access engine (DMA) 5003 is illustrated within SIU 5002, and is utilized as a well-known tool for accessing and transferring data packets between separate memories or from a buffering system into a memory as performed by software.

PMU 5004 is responsible for packet management and accounting. A queuing system (QS) 5008 is provided within PMU 5004 and adapted for queuing packet identifiers and other pertinent information about data packets in the system. QS 5008 is dynamic and updated as packets are processed and sent out of DMS 5000. Functions and capabilities of QS 5008 are dependent upon read and write requests occurring during packet processing.

A packet memory management unit (PMMU) 5010 is provided within PMU 5004 and adapted to provide packet identifiers and to allocate and manage blocks of memory where packets will be stored during processing within DMS 5000. Much detail about the PMMU is provided in the description of priority application Ser. No. 09/737,375, more particularly under the sections entitled "Overview of the PMU" and "Paging Memory Management Unit (PMMU)". The terms packet and paging are both used in the acronym PMMU as the first term in the acronym. Packet memory refers to memory that data packets will occupy during processing, and paging memory refers to actual pre-configured pages of memory (atomic and virtual) allocated for packet storage, and therefore is synonymous with packet memory. Much detail about the QS is provided in the disclosure of priority application Ser. No. 09/737,375, as the specification focuses on the novel aspects of the QS in a DMS processor.

A local packet memory (LPM) 5006 is provided within PMU 5004 and adapted as a hardware-controlled memory as described with reference to priority application Ser. No. 09/737,375 throughout the specification. LPM 5006 has memory allocations of specifically-sized blocks for facilitating consecutive data packet storage. Atomic pages and virtual pages are terms of application Ser. No. 09/737,375 used to describe the size-specific (Bytes) memory blocks. It is noted that such size allocations are somewhat dynamic, meaning that specific size parameters may be changed during configuration for adapting to changing packet sizes of packets coming into DMS 5000. LPM is described in this specification as hardware-controlled memory.

A register transfer unit (RTU) 5007 is provided within PMU 5004 and adapted to select available context registers maintained within a processing core that are adapted to accept pre-loaded packet information for processing. RTU 5007 keeps track of which contexts are available to PMU 5004 and which the processing core owns. RTU 5007 is a transfer unit in the literal sense in that ownership of context registers is literally transferred between the PMU and a processing core illustrated herein as a streaming processor unit (SPU) 5011. The context registers are represented logically in this example by a block labeled Context within SPU 5011 and assigned the element number 5012. There is a plurality of context registers in actual practice.

SPU 5011 is responsible for processing data-packet information according to information loaded into context 5012. As described above in reference to DMS technology as known to the inventor, SPU 5011 is capable of simultaneously executing multiple processing streams or instructions. A software-controlled memory 5013, referred to with reference to Ser. No. 09/737,375 as EPM for external packet memory, is provided for software controlled packet storage. In this embodiment, memory 5013 is implemented externally from LPM 5006. In another embodiment it may be a sectored part of a total memory block of which LPM is a part. In still another embodiment memory 5013 may be memory of a peripheral system connected to DMS 5000. There are many possible locations for memory 5013.

In practice, it is a preferred method of the present invention to divert data packets from NIA 5001 to memory 5013 in cases where the packets are determined not to fit in LPM 5006, which is a preferred location for data packet storage. However, no matter how diversified the memory-block size configuration for LPM 5006 may be, it is still probable that some incoming packets will not be compatible for LPM storage. Attempting to store such packets in LPM 5006 can cause fragmentation and loss of data.

All data packets stored within LPM 5006 of PMU 5004 arrive through SIU 5002 by way of NIA 5001. Therefore, SIU 5002 is referred to in this specification as the sender of data packets whether or not they are accepted by the PMU. PMU 5004 is notified when a next data packet for processing arrives and must decide whether or not the packet will be uploaded to LPM 5006 or diverted to an external (software controlled) memory. To accomplish this, the PMU has to have the size information of the data packet. In one embodiment, SIU 5002 begins to send the data packet to PMU 5004. The size of the packet is the first data PMU 5004 will receive. If PMMU 5010 determines that the packet will not fit LPM 5006, then it will halt the upload and request an overflow. In another embodiment, SIU 5002 simply sends a control message containing just the size information of the packet. PMMU 5010 then determines fit status and notifies SIU 5002 whether or not it will accept the packet. In the case of overflow, PMMU 5010 additionally provides memory addresses in the software-controlled memory to the SIU for the packet in the same transaction. After a packet is being uploaded, whether into SW-controlled memory or into LPM, QS 5008 will eventually have all of the required data about the packet. PMMU 5010, which is the hardware mechanism responsible for fit determination, provides memory address allocation, and provision of packet identification after upload, as well as accounting function after eventual download of the packet to egress.

PMMU 5010 is logically illustrated as having communication capability with QS 5008 via a solid double-arrowed line connecting the two system components. If PMMU 5010 determines that the next packet fits in LPM 5006 (i.e. there is de-allocated or otherwise available LPM to consecutively store the packet), then PMU 5004 will upload the packet into LPM 5006. A broken double arrow emanating from within SIU 5002 and progressing into LPM 5006 logically illustrates this case. In this case, PMMU 5010 has allocated the virtual page or pages to store the packet and will provide a packet identifier to QS 5008 after uploading is complete. PMMU also has updated the memory allocation state of LPM 5006 after uploading the packet into LPM 5006.

RTU 5007 is logically illustrated as in direct communication with PMMU 5010 by a solid double-arrowed line connecting the two system components. RTU 5007 is responsible for selecting and pre-loading an available context from contexts 5012 for SPU processing. A broken double-arrowed line emanating from RTU 5007 and intersecting with an illustrated SIU/SPU communication path 5014 represents this case. When SPU 5011 notifies PMU 5004 that the packet processing is completed, then PMU 5004 downloads the packet out of LPM 5006 to Egress (interface 5001). The PMU can be configured not to overflow a packet when it does not fit into the LPM. If this is the case, the packet will be dropped. A configuration register (not illustrated) within PMU is provided to store the flag bit. In the case that a packet is dropped because it is determined not to fit in LPM 5006 PMU 5004 receives the entire packet. That is, from the point of view of the sender of that packet (SIU) the packet was successfully sent into the PMU. However, PMU 5004 performs no functions associated with the packet and all packet data is discarded.

For accounting purposes only, PMU 5004 notifies software that a packet drop has occurred. This notification occurs through an interrupt to the SPU core. A stream running on SPU 5010 can respond to the generated interrupt and take whatever action is currently specified. For example, SW might generate and send a control packet to the external device that originally sent the dropped packet as an alert that the packet was dropped. SW may instead just execute an increment to a counter that keeps record of the total number of dropped packets for bookkeeping purposes.

It is noted herein that PMU 5004 does not allow any other packet from that same input device id to be dropped until SW has been notified of the packet drop event, and until SW has completed processing any action taken regarding the packet-drop event.

In order to insure that a second packet is not dropped before SW has had a chance to react to the initial packet drop, PMU 5004, more particularly PMMU 5010, implements a locking mechanism for the input device ID that is the originator of the dropped packet, so that no additional packets from that device will be dropped until software has cleared the lock. This is accomplished by writing a new value into a configuration register within PMU 5004 adapted for the purpose. Such a register may also have other information about the dropped packet inserted therein. If a subsequent packet arrives from the same device ID before the lock is cleared and that packet needs to also be dropped, it will wait in a buffer until the lock is cleared by SW. The asserted lock on a device ID resulting from a dropped packet in the system is specific only to that particular device ID experiencing a dropped packet and does not affect packets coming in that are determined to fit in LPM 5006.

In a preferred embodiment, the interrupt generated by the PMU to let software know of a new packet drop is shared among the different device id's; in other words, one or more packets might have been dropped by the time software takes the interrupt). Thus, the value of the lock bit(s) should be visible by software. A solution is to implement these lock bit(s) as configuration registers that software can both write (to clear the drop condition) and read (to figure out from which device id the packet(s) got dropped).

Now consider a data packet arriving through NIA 5001 that will not fit into LPM 5006 wherein PMU 5004 is configured (flag) for packet overflow enabled. In this case PMU 5004 is notified of the packet arrival by SIU 5002 as described above. PMMU 5010 determines the size of the incoming data packet and checks whether there is any space in LPM 5006 to store the packet. If it is determined that there is no space within LPM 5006 to store the incoming packet, then PMMU 5010 initiates a request to, in this case, SIU 5002 for packet overflow according to the flag activated within PMU 5004. In the case of data packet overflow PMU 5004 will not upload or physically receive the packet from SIU 5002.

In the case of packet overflow initiation, then PMU 5004 sends a request to SIU 5002 to upload the data packet into, in this case, SW controlled memory 5013. SIU 5002 utilizes DMA 5003 to gain access to memory 5013 over a logically illustrated data path represented herein by a solid double-arrowed line, connecting component SIU to memory 5013. In this case, the data packet is transferred from an in buffer (not illustrated) in SIU 5002 directly into memory 5013 with no direct PMU involvement except that SIU 5002 accesses some information provided by the PMU through configuration registers.

PMMU 5010 performs some additional functions, in case of software storage (overflow), that are not performed in conjunction with LPM packet storage. A context register CR 5005 is provided within PMU 5004 and adapted to store at least one or, in some cases, more than one memory pointer or beginning address to available memory blocks or pages in memory 5013. PMMU 5010 provides at least a next beginning memory address for a packet that will be overflowed into memory 5013. PMMU 5010 also provides a packet identifier for the overflowed packet after that packet has been uploaded by SW just as it would if the packet fit LPM 5006 and was stored there instead of being overflowed. In this case, SIU 5002 performs the actual uploading and downloading. In another embodiment an alternate SW unit may be adapted to perform uploads and downloads of packets destined for memory 5013. Further, a packet uploaded into EPM could be downloaded from LPM (and vice-versa) if software has explicitly moved the packet from one memory to the other one.

QS 5008 has all of the information about the overflowed packet just as it would for packet stored in hardware-controlled memory. In one embodiment PMMU 5010 sets a lock bit 5009 in CR 5005 that is specific to the device ID representing the originator of the overflowed data packet. This lock bit is different from the previous lock bit described above regarding the packet drop mechanism. In this case there are two physically different lock bits. In an alternative embodiment there is a lock mechanism that fulfills all of the lock functions by specifying no lock, lock due to drop or lock due to overflow.

Lock 5009 prevents overflow initiation of subsequent data packets from that device ID until SPU 5011 has acknowledged the notification of the overflow. The PMU notifies SW when a packet overflow operation is in progress. RTU 5007 is notified of a request for a context by software if software does not already own an available context. The lock bit is cleared by provision of a new beginning memory address for a next overflow packet.

Each time a packet is uploaded to or downloaded from memory 5013 by SIU 5002, PMU 5004 must request the action and provide the starting address where the packet will be uploaded to or downloaded from. SPU 5011 notifies PMU 5004 after processing. The method of the present invention is integrated with PMMU function and exercised during normal packet routing operations. PMU 5004 generates a SW interrupt whenever a data packet is being overflowed into memory 5013. SW running in a stream in SPU 5011 looks up and provides a next starting address within memory 5013 for a next data packet that might be overflowed. In this way, packets from a same device ID that need to be overflowed do not have to wait for a previous packet to be completely processed and downloaded from memory 5013.

In one embodiment of the present invention, the method is device ID specific, such that the lock bit is set to prevent a subsequent packet overflow from initiating before a previous packet from the same device ID has been acknowledged and a new address has been computed and written in to CR 5005. For example if input device 0 has a packet in overflow and a subsequent packet from 0 has arrived and is determined to require overflow, then that subsequent packet must wait until a new address is written into CR 5005. In this case, a packet arriving from device ID 1 would have an address specific to that packet and could be overflowed simultaneously with a packet from device 0. In another embodiment, the method of the invention is device ID independent and a lock bit applies to all input device IDs for upload into software-controlled memory. However, for download from software-controlled memory, the method is device dependent concerning all output device IDs. In preferred embodiments, upon the download of the packets, there is no need for lock bits, since the processing is already done and there is no need to sync up with software.

It will be apparent to one with skill in the art that the method and apparatus of the present invention can be applied to any data node involved in data routing without departing from the spirit and scope of the invention, as long as the physical hardware is present including two distinct memories. In one embodiment, a separate hardware-controlled memory may be provided for overflowing data packets that do not fit in a primary hardware-controlled memory. Moreover, a third memory that is software-controlled may be provided as an ultimate backup for packets not fitting into either of the hardware-controlled memories. There are many configuration possibilities.

Figure 11:
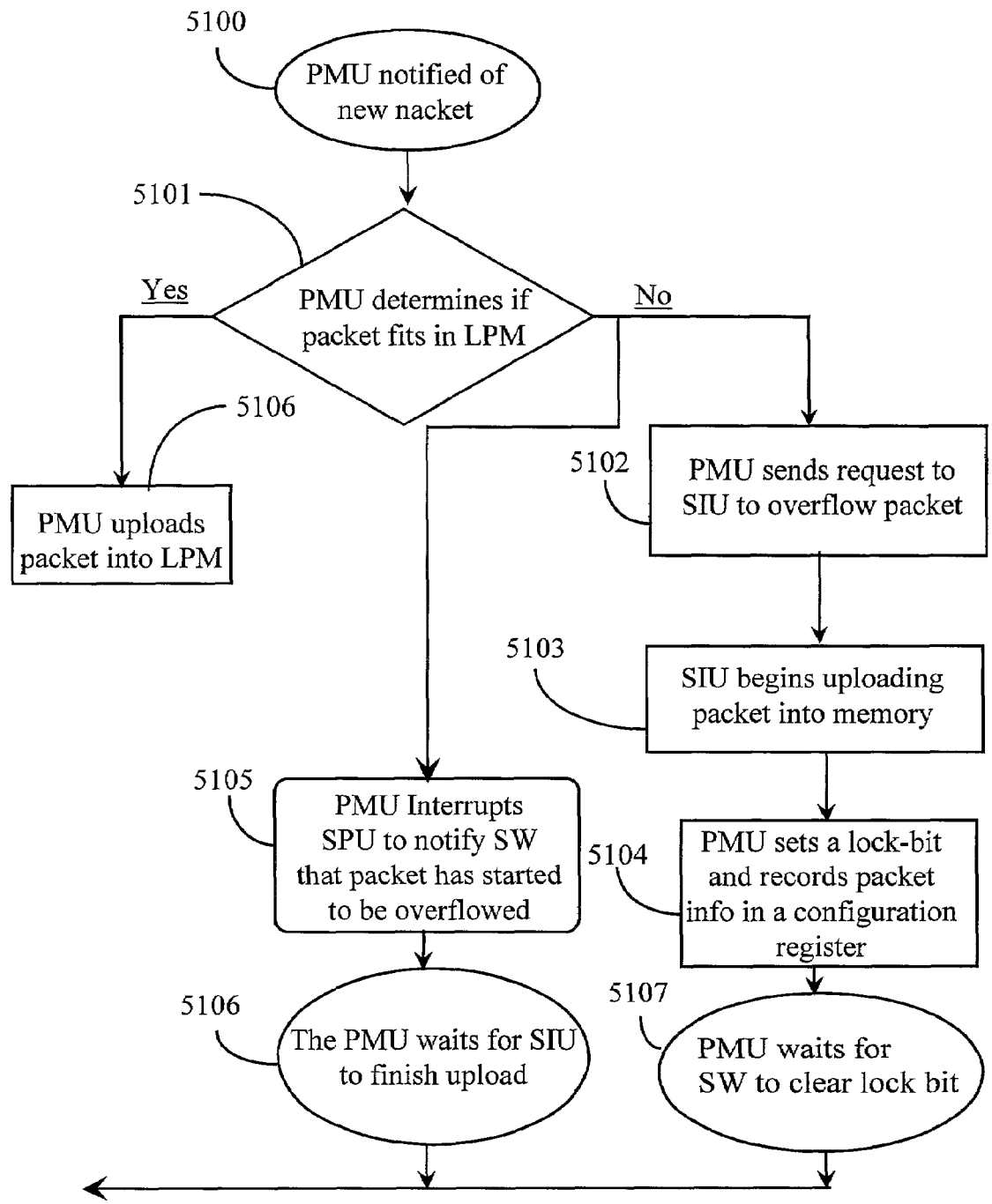
FIG. 11 is a process flow chart illustrating logic steps for packet overflow according to an embodiment of the present invention.

FIG. 11 is a process flow chart illustrating logic steps for packet overflow upload according to an embodiment of the present invention. At step 5100, a packet management unit analogous to PMU 5004 described with reference to FIG. 10 is notified of the arrival of a data packet for processing. At this step, the data packet is in buffer in a system interface unit (SIU) and originates from one of existing input devices. At step 5101, PMU determines if the pending packet fits into local packet memory (LPM). The PMU is aware of the size of the packet and checks if there are any pages available within LPM to store the packet. This process is algorithmic in nature. A page memory management unit analogous to PMMU 5010 of FIG. 10 above performs the actual computation using an algorithm.

If the pending packet fits into LPM at step 5101, then at step 5106 the PMU uploads the packet into LPM. In this case, of course, there is no packet overflow process. In one embodiment, the packet may be dropped after step 5101 if it is determined that the packet does not fit into the LPM and packet overflow is not enabled within the PMU.

If it is determined at step 5101 that the packet does not fit into LPM and packet overflow is enabled within the PMU, then at step 5102, the PMU sends a request to the SIU to overflow the packet into SW-controlled memory. The request includes a beginning address in SW memory analogous to memory 5013 of FIG. 10 where the packet should be uploaded. The PMU address is taken from an overflow-address configuration register. This register is updated by software when a next address is available for overflow of a next data packet.

At this point the PMU has not accepted the data packet and will not be directly involved in getting the data packet into SW memory. Only accounting functions are performed at the PMU level for packets not residing in LPM memory. At step 5103, the SIU uploads the data packet into the SW-controlled memory. At step 5104, which may run concurrently with step 5103, the PMU sets a lock-bit into the overflow address register and writes some additional packet information into additional registers that software may access and read. This information includes packet size (SizeOfPacket) and the time of initialization of the packet overflow (OverflowTimeStamp).

At step 5105, the PMU generates a software interrupt to notify software that a packet overflow has been initialized. This step may logically begin after step 5102, and may be performed in parallel with steps 5102, 5103 and 5104. The purpose for this interrupt is so that software can immediately compute a next beginning address for overflowing a next data packet. The software writes the computed address into the overflow address register clearing the lock bit. It is noted herein and described further above that there may be two modes for overflow into SW memory. In one mode, the lock-bit set in the overflow address register, which is analogous to CR 5005 and lock 5009 described with reference to FIG. 10 above, is device ID independent in terms of input devices. That is to say that if device 0 is locked, no packet overflow can occur on packets sent from that device until the lock is cleared. A packet arriving from device 1 may be overflowed even if the lock for device 0 is set. In an alternative mode, there is no device dependency, and the lock is common to all input device IDs registered.

At step 5106, the PMU waits for the SIU to complete the overflow, assigns a packet identifier to the packet, and inserts the packet into the QS. At step 5107 the PMU waits for software to clear the lock bit or bits. Software (running on the SPU) determines the address in EPM where a next packet to be overflowed will be stored. This value is written in a config register of the PMU, which triggers the clearance of the overflow lock bits or lock-bit register. Writing the new value into the register does not need occur when the overflowed packet is fully processed; it can be done immediately after interrupt is generated and taken by software. In a preferred embodiment, the functional aspect of determining that a packet needs to be overflowed and initiating the request to trigger the overflow interaction is performed by the page memory management unit or PMMU analogous to PMMU 5010 described with reference to FIG. 10 above. The process steps described herein assumes that a flag is set to packet overflow instead of packet drop.

It will be apparent to one with skill in the art that the process steps described herein may be further granulated into sub-steps without departing from the spirit and scope of the invention. For example, in step 5104 the PMU may be responsible for initiating multiple locks that are each specific to an input device ID.

Figure 12:
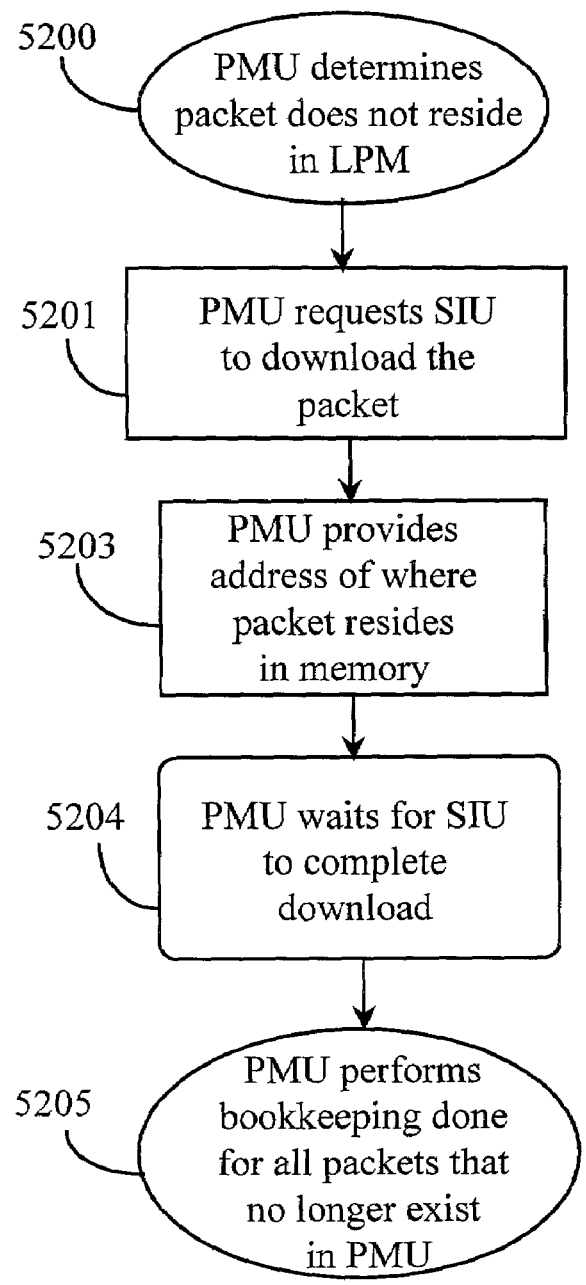
FIG. 12 is a process flow diagram illustrating steps for performing overflow retrieval according to an embodiment of the present invention.

FIG. 12 is a process flow diagram illustrating steps for performing overflow retrieval according to an embodiment of the present invention. At step 5200, the PMU determines that a packet that has been completely processed and ready for egress is not present in LPM. Preceding this determination, SW has notified PMU that the packet processing of the particular packet is complete.

At step 5201, the PMU sends a request to the SIU to download the packet from SW-controlled memory. At step 5203, the PMU provides the memory address pointing to the beginning of where the packet resides in SW-controlled memory to the SIU. In one embodiment of the present invention steps 5201 and 5202 are accomplished in a single transaction between the PMU and SIU. The PMU waits for the SIU to finish downloading the packet to an egress buffer within the SIU at step 5204. At step 5205 the PMU performs all of the bookkeeping and accounting functions for the egressed packet just as it would for any other data packet leaving the system.

It is noted herein that the overflow process is performed independently with regard to download from memory for each registered output device ID. That is to say that packets residing in SW-controlled memory are downloaded and sent out one at a time per device ID. It is also noted herein that software interrupts generated to tell SW to look for a next overflow address are also device independent in one mode. That is, SW must determine which device ID needs a new memory address for a packet to arrive for overflow. In a preferred embodiment the required data is written into an overflow lock register maintained within the PMU.

In the disclosure teaching thus far, it is assumed that there is no data packet interleaving with respect to port transmission. In other words, a port may transmit only one packet at a time. Moreover, the address allocation mechanism relies on this fact. However, the preferred application of the invention should not be construed as limited to overflow of only one packet at a time from any given port. With additional hardware implemented within the PMU, more than one packet from a same port may be overflowed as long as enough registers exist to store the required extra information.

It will be apparent to one skilled in the art that the embodiments of the invention described in this specification are exemplary, and may vary in a multitude of ways without departing from the spirit and scope of the present invention. It will also be apparent to one skilled in the art that many alternatives, variations, and configurations are possible and the scope of the invention is limited only by the claims that follow.

What is claimed is:

1. A system for managing packets incoming to a data router comprising:

a local packet memory (LPM) mapped into pre-configured memory units, to store packets for processing;

an external packet memory (EPM) for storing overflow data which is not storable by said LPM;

a first storage system coupled to said LPM, to determine a size of said packets to be stored in said LPM, and for determining whether said packets can be stored in said LPM, wherein in determining whether said packets can be stored in said LPM, the first storage system is configured to consider unallocated portions of the local packet memory in increments of one or more fixed sizes; and a second storage system coupled to said first storage system, for receiving an indication from said first storage system when it cannot store said packets in said LPM, and for storing said packets in said LPM;

wherein said first storage system attempts to store all said packets in said LPM, and for those packets that are not storable within said LPM, relinquishes control to said second system, which stores said packets in said LPM; and wherein said system is configured to adjust said one or more fixed sizes to include more or fewer fixed size increments which may be considered by the first storage system when the first storage system considers whether said packets can be stored in the LPM.

2. The system of claim 1 wherein said first storage system is hardware controlled and said second storage system is software-controlled.

3. The system of claim 1 wherein the data router is connected to and operates on the Internet network.

4. The system of claim 1 wherein the data router is connected to and operates on a corporate wide-area-network (WAN).

5. The system of claim 2 wherein the first storage system is implemented as an integrated circuit (IC) or IC chip set.

6. The system of claim 1 wherein said first storage system provides a memory address to said second storage system if said packets cannot be stored in said EPM.

7. A data packet router comprising:

external ports to receive and send data packets from and to neighboring connected routers; and a system coupled to said external ports, for managing said packets incoming to a data router, the system comprising: a local packet memory (LPM) mapped into pre-configured memory units, to store packets for processing, each of said pre-configured memory units being resizable by said system;

an external packet memory (EPM) for storing overflow data which is not storable by said LPM;

a first storage system coupled to said LPM, to determine the size of said packets to be stored in said LPM, for determining whether said packets can be stored in said LPM, and to store packets in said LPM, wherein in determining whether said packets can be stored in said LPM, the first storage system is configured to consider unallocated portions of the local packet memory in increments of one or more fixed sizes; and a second storage system coupled to said first storage system, for receiving an indication from said first storage system when it cannot store said packets in said LPM and for storing said packets in said LPM;

wherein said first storage system attempts to store all said packets in said LPM, and for those packets that are not storable within said LPM, relinquishes control to said second system, which stores said packets in said LPM; and wherein said router is configured to adjust said one or more fixed sizes to include more or fewer fixed size increments which may be considered by the first storage system when the first storage system considers whether said packets can be stored in the LPM.

8. The router of claim 7 wherein said first storage system is hardware-controlled and said second storage system is software-controlled.

9. The router of claim 7 wherein the data router is connected to and operates on the Internet network.

10. The router of claim 7 wherein the data router operates on a corporate wide-area-network.

11. A method for managing packets incoming to a data router, comprising the steps of:

storing incoming packets, by a first storage system, into a local packet memory (LPM) that is mapped into pre-configured but resizable memory units;

determining whether incoming packets are storable within the LPM, wherein said determining comprises considering unallocated portions of the local packet memory in increments of one or more fixed sizes;

relinquishing packets not storable within the LPM to a second storage system;

storing the packets not storable within the LPM in an external packet memory by a second storage system, and adjusting said one or more fixed sizes to include more or fewer fixed size increments which may be considered by the first storage system when the first storage system considers whether said packets can be stored in the LPM.

12. The method of claim 11 wherein the first storage system is hardware controlled and the second storage system is software controlled.

13. The method of claim 11 wherein in the data router is connected to and operates on a corporate wide-area-network (WAN).

14. The method of claim 11 wherein the first and second storage systems are implemented as an integrated circuit (IC) or IC chip set.

15. The method of claim 14 wherein in step (c) the second storage system is software-controlled.

16. The system of claim 1, wherein said system is configured to adjust said one or more fixed sizes based at least in part on a size of said packets.

17. The system as recited in claim 1, wherein the first storage system is configured to consider unallocated portions of the local packet memory in increments of two or more fixed sizes in parallel.

18. The router of claim 7, wherein said router is configured to adjust said one or more fixed sizes based at least in part on a size of said packets.

19. The router as recited in claim 7, wherein said router is configured to consider unallocated portions of the local packet memory in increments of two or more fixed sizes in parallel.

20. The method of claim 11, wherein adjusting said one or more fixed sizes is based at least in part on a size of said packets.

21. The method of claim 11, further comprising considering unallocated portions of the local packet memory in increments of two or more fixed sizes in parallel.

\* \* \* \* \*